(12) United States Patent
Grosse et al.

(10) Patent No.: US 11,494,496 B2
(45) Date of Patent: Nov. 8, 2022

(54) MEASURING OVERFITTING OF MACHINE LEARNING COMPUTER MODEL AND SUSCEPTIBILITY TO SECURITY THREATS

(71) Applicant: International Business Machines Corporation, Armonk, NY (US)

(72) Inventors: Kathrin Grosse, Clausthal-Zellerfeld (DE); Taesung Lee, Ridgefield, CT (US); Youngja Park, Princeton, NJ (US); Ian Michael Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/833,884

(22) Filed: Mar. 30, 2020

(65) Prior Publication Data

US 2021/0303695 A1    Sep. 30, 2021

(51) Int. Cl.
*G06F 21/57* (2013.01)
*G06F 17/18* (2006.01)
(Continued)

(52) U.S. Cl.
CPC ............ *G06F 21/577* (2013.01); *G06F 17/18* (2013.01); *G06N 3/08* (2013.01); *G06N 20/10* (2019.01)

(58) Field of Classification Search
CPC ......... G06F 21/577; G06F 17/18; G06N 3/08; G06N 20/10; G06N 3/0454
See application file for complete search history.

(56) References Cited

U.S. PATENT DOCUMENTS

2018/0330379 A1    11/2018  Zoldi et al.
2019/0294954 A1     9/2019  Han et al.
(Continued)

FOREIGN PATENT DOCUMENTS

WO    WO2019/028269 A2    2/2019

OTHER PUBLICATIONS

Achille, Alessandro et al., "The Information Complexity of Learning Tasks, their Structure and their Distance", Technical Report UCLA CSD180003, Jun. 15, 2018, Revised Apr. 4, 2019, submitted version arXiv:1904.03292v1 [cs.LG] Apr. 5, 2019, 20 pages.
(Continued)

*Primary Examiner* — Meng Li
(74) *Attorney, Agent, or Firm* — Stephen J. Walder, Jr.; Jeffrey S. LaBaw

(57) ABSTRACT

Mechanisms are provided to determine a susceptibility of a trained machine learning model to a cybersecurity threat. The mechanisms execute a trained machine learning model on a test dataset to generate test results output data, and determine an overfit measure of the trained machine learning model based on the generated test results output data. The overfit measure quantifies an amount of overfitting of the trained machine learning model to a specific sub-portion of the test dataset. The mechanisms apply analytics to the overfit measure to determine a susceptibility probability that indicates a likelihood that the trained machine learning model is susceptible to a cybersecurity threat based on the determined amount of overfitting of the trained machine learning model. The mechanisms perform a corrective action based on the determined susceptibility probability.

20 Claims, 9 Drawing Sheets

(51) Int. Cl.
G06N 20/10 (2019.01)
G06N 3/08 (2006.01)

(56) References Cited

U.S. PATENT DOCUMENTS

| | | | | |
|---|---|---|---|---|
| 2020/0125968 | A1* | 4/2020 | Hazard | G06N 5/02 |
| 2020/0167471 | A1* | 5/2020 | Rouhani | G06N 7/005 |
| 2020/0285939 | A1* | 9/2020 | Baker | G06N 3/082 |
| 2021/0064760 | A1* | 3/2021 | Sharma | G06N 20/00 |
| 2021/0064929 | A1* | 3/2021 | Trim | G06K 9/6257 |
| 2021/0334656 | A1* | 10/2021 | Sjögren | G06N 3/08 |

OTHER PUBLICATIONS

Biggio, Battista et al., "Wild Patterns: Ten Years After the Rise of Adversarial Machine Learning", Pattern Recognition, 84: 317-331, Jul. 19, 2018, 17 pages.
Bishop, Christopher M., "Pattern Recognition and Machine Learning", 5th Edition, Springer, Description and Table of Contents submitted, 2006, 16 pages.
Brown, Tom B. et al., "Adversarial Patch", 31st Conference on Neural Information Processing Systems (NIPS 2017), submitted version arXiv:1712.09665v1 [cs.CV], Dec. 27, 2017, 6 pages.
Carlini, Nicholas et al., "Towards Evaluating the Robustness of Neural Networks", 2017 IEEE Symposium on Security and Privacy (SP), arXIV: 1608.04644v2 [cs.CR] Mar. 22, 2017, 19 pages.
Chen, Bryant et al., "Detecting Backdoor Attacks on Deep Neural Networks by Activation Clustering", Workshop on Artificial Intelligence Safety at AAAI, 2019, submitted version arXiv: 1811.03728v1 [cs.LG], Nov. 9, 2018, 10 pages.
Cohen, Jeremy et al., "Certified Adversarial Robustness via Randomized Smoothing", Proceedings of the 36th International Conference on Machine Learning, Jun. 9-15, 2019, 11 pages.
Fligner, Michael A., "Distribution-Free Two-Sample Tests for Scale", Journal of the American Statistical Association, vol. 71, 1976—Issue 353, Received Aug. 1, 1974, Published online Apr. 5, 2012, Abstract submitted, 7 pages.
Ford, Nicolas et al., "Adversarial Examples Are a Natural Consequence of Test Error in Noise", Proceedings of the 36th International Conference on Machine Learning, Jun. 9-15, 2019, 10 pages.
Frigge, Michael et al., "Some Implementations of the Boxplot", The American Statistician, vol. 43, 1989—Issue 1, Received Aug. 1, 1987, Published online Feb. 27, 2012, Abstract submitted, 7 pages.
Geman, Stuart et al., "Neural Networks and the Bias/Variance Dilemma", Neural Computation 4(1):1-58, Jan. 1992, 58 pages.
Gu, Tianyu et al., "BadNets: Identifying Vulnerabilities in the Machine Learning Model Supply Chain", Cornell University Library, arXiv:1708.06733v1 [cs.CR] , Aug. 22, 2017, 13 pages.
He, Kaiming et al., "Deep Residual Learning for Image Recognition", In IEEE Conference on Computer Vision and Pattern Recognition, Jun. 2016, 9 pages.
Hitaj, Briland et al., "Deep Models Under the GAN: Information Leakage from Collaborative Deep Learning", ACM Conference on Computer and Communications Security (CCS'17), Oct. 30-Nov. 3, 2017, 16 pages.
Hodges, Jr., J. L., "The significance probability of the Smirnov two-sample test", Arkiv for Matematik Band 3 nr 43, Jun. 5, 1957, 18 pages.
Krizhevsky, Alex, "Learning Multiple Layers of Features from Tiny Images", University of Toronto, Tech. Rep., Apr. 8, 2009, 60 pages.
Lecun, Yann et al., "Gradient-Based Learning Applied to Document Recognition", Proceedings of the IEEE, Nov. 1998, 46 pages.
Liu, Shengchao et al., "Bad Global Minima Exist and SGD Can Reach Them", ICML 2019 Workshop Deep Phenomena, Jun. 15, 2019, submitted version arXiv: 1906.02613v1 [cs.LG] Jun. 6, 2019, 13 pages.
Liu, Yingqi et al., "Trojaning Attack on Neural Networks", Network and Distributed Systems Security (NDSS) Symposium 2018, Feb. 18-21, 2018, 15 pages.
Madry, Aleksander et al., "Towards Deep Learning Models Resistant to Adversarial Attacks", Sixth International Conference on Learning Representations (ICLR 2018), Apr. 30-May 3, 2018, 23 pages.
Miyato, Takeru et al., "Distributional Smoothing with Virtual Adversarial Training", 4th International Conference on Learning Representations, ICLR 2016, May 2-4, 2016, submitted version arXiv:1507.00677v9 [stat.ML], Jun. 11, 2016, 12 pages.
Moosavi-Dezfooli, Seyed-Mohsen et al., "Universal adversarial perturbations", 2017 IEEE Conference on Computer Vision and Pattern Recognition, CVPR 2017, Jul. 21-26, 2017, 9 pages.
Oh, Seong J. et al., "Towards Reverse-Engineering Black-Box Neural Networks", Sixth International Conference on Learning Representations, ICLR 2018, Apr. 30-May 3, 2018, submitted version arXiv: 1711.01768v3 [stat.ML], Feb. 14, 2018, 20 pages.
Olkin, Ingram, "Contributions to probability and statistics; essays in honor of Harold Hotelling", Stanford University, Press, 1960, 2 pages.
Papernot, Nicolas, "A Marauder's Map of Security and Privacy in Machine Learning", arXiv:1811.01134v1 [cs.CR], Nov. 3, 2018, 20 pages.
Salem, Ahmed et al., "ML-Leaks: Model and Data Independent Membership Inference Attacks and Defenses on Machine Learning Models", Network and Distributed Systems Security (NDSS) Symposium 2019, Feb. 24-27, 2019, 15 pages.
Shokri, Reza et al., "Membership Inference Attacks Against Machine Learning Models", IEEE Symposium on Security and Privacy (S&P), May 22-24, 2017, 16 pages.
Stutz, David et al., "Disentangling Adversarial Robustness and Generalization", In IEEE Conference on Computer Vision and Pattern Recognition, CVPR 2019, Jun. 16-20, 2019, 12 pages.
Szegedy, Christian et al., "Intriguing properties of neural networks", International Conference on Learning Representations, ICLR 2014, Apr. 14-16, 2014, submitted version arXiv:1312.6199v4 [cs.CV], Feb. 19, 2014, 10 pages.
Tran, Brandon et al., "Spectral Signatures in Backdoor Attacks", 32nd Conference on Neural Information Process Systems (NeurIPS 2018), Dec. 2-8, 2018, 11 pages.
Wang, Bolun et al., "Neural Cleanse: Identifying and Mitigating Backdoor Attacks in Neural Networks", Proceedings of 40th IEEE Symposium on Security and Privacy, IEEE, May 20-22, 2019, 17 pages.
Wang, Binghui et al., "Stealing Hyperparameters in Machine Learning", 39th IEEE Symposium on Security and Privacy (SP), May 2018, 17 pages.
Werpachowski, Roman et al., "Detecting Overfitting via Adversarial Examples", 33rd Conference on Neural Information Processing Systems (NeurIPS 2019), Dec. 8-14, 2019, 11 pages.
Xiao, Han et al., "Fashion-MNIST: A Novel Image Dataset for Benchmarking Machine Learning Algorithms", arXiv: 1708.07747v2 [cs.LG], Sep. 15, 2017, 6 pages.
Zhu, Chen et al., "Transferable Clean-Label Poisoning Attacks on Deep Neural Nets", Proceedings of the 36th International Conference on Machine Learning, PMLR 2019, Jun. 9-15, 2019, 10 pages.
Goodfellow, Ian J. et al., "Explaining and Harnessing Adversarial Examples", Published as a conference paper at ICLR 2015, arXIV: 1412.6572v3 [stat.ML] Mar. 20, 2015, 11 pages.

* cited by examiner

MEASURING OVERFITTING OF MACHINE LEARNING COMPUTER MODEL AND SUSCEPTIBILITY TO SECURITY THREATS

BACKGROUND

The present application relates generally to an improved data processing apparatus and method and more specifically to mechanisms for measuring overfitting of machine learning computer models and their susceptibility to security threats.

Deep learning is part of a broader family of machine learning methods based on learning data representations as opposed to task-specific algorithms. Some representations of deep learning are loosely based on an interpretation of information processing and communication patterns in a biological nervous system, such as neural coding that attempts to define a relationship between various stimuli and associated neuronal responses in the brain. Research in machine learning attempts to create efficient systems to learn these representations from large-scale, unlabeled data sets.

Deep learning architectures, such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts. Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

The increase in availability of training data for training such machine learning or deep learning algorithms or models, as well as increased computation power, has led to a large increase in the usage of machine learning (ML) computer models and associated applications. At the same time, this wide-spread adoption of machine learning/deep learning raises many security and privacy concerns.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory comprising instructions executed by the at least one processor to determine a susceptibility of a trained machine learning model to a cybersecurity threat. The method comprises executing a trained machine learning model on a test dataset to generate test results output data, and determining an overfit measure of the trained machine learning model based on the generated test results output data. The overfit measure quantifies an amount of overfitting of the trained machine learning model to a specific sub-portion of the test dataset. The method also comprises applying analytics to the overfit measure to determine a susceptibility probability that indicates a likelihood that the trained machine learning model is susceptible to a cybersecurity threat based on the determined amount of overfitting of the trained machine learning model. Moreover, the method comprises performing a corrective action based on the determined susceptibility probability.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figures 1A, 1B:
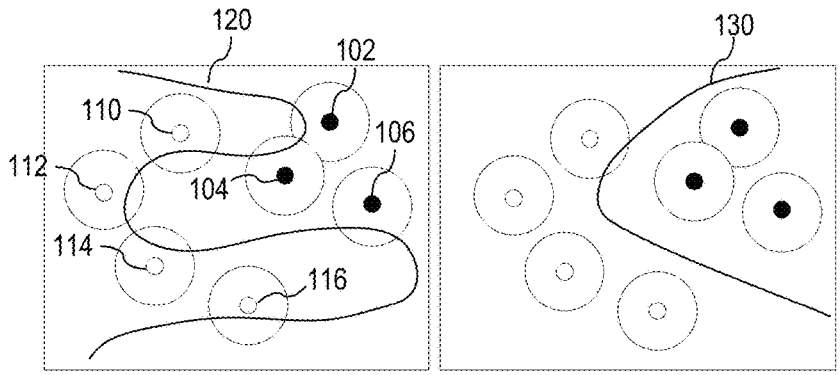
FIGS. 1A and 1B illustrate examples of wobbly (overfit) and non-wobbly (non-overfit) decision curves for a deep neural network (DNN) to demonstrate an observation providing a basis for the wobbliness measure implemented by the mechanisms of the illustrative embodiments.

As mentioned above, the increase in availability of training data, as well as increased computation power, has led to a large increase in the usage of machine learning (ML) computer models and associated applications, which in turn has raised many security and privacy concerns with regard to these ML computer models. Such ML computer or cognitive (artificial intelligence) computer models may be used to provide image analysis, facial recognition, fingerprint or retinal image recognition, speech pattern analysis, or the like, for a cognitive security system, such as an image recognition surveillance system, a biometric authentication system, etc. Recently, such machine learning or cognitive models have been used in various vehicle systems, such as vehicle collision avoidance systems, autonomous vehicle navigation systems, and the like. The machine learning or cognitive models may be implemented in many different ways, examples of which include, but are not limited to, convolutional neural networks (CNNs), deep learning systems, deep learning neural networks or deep neural networks (DNNs), and the like.

Often times, such machine learning or cognitive models are utilized in or with cognitive computing systems (sometimes referred to as cognitive systems or artificial intelligence systems) to perform a classification operation upon which the cognitive system operates to perform a cognitive operation, e.g., classifying an input into one of a plurality of predetermined classifications (classes) which is then used to perform a more complex analysis or reasoning operation using cognitive system mechanisms. For example, in an autonomous vehicle navigation system, the machine learning model is utilized to classify captured images into classes of objects so as to be able to discern what objects are present in the environment of the vehicle and make appropriate navigation decisions to ensure the drivability and safety of the vehicle and its passengers, e.g., identifying stop signs to determine that the vehicle should slow to a stop prior to entering an intersection.

In order to train these machine learning or cognitive models (hereafter referred to simply as "models"), a large amount of training data is typically required with significant amounts of training time to establish the correct settings of weights within the internal layers of the trained model to achieve correct outputs, e.g., correct classifications. As a result, many models are trained using fully or partially outsourced training data and training operations. For example, cloud services have been created where a party may deploy their model to the cloud and have cloud services train and test the model using various training datasets from a variety of different sources, and deploy the model for runtime use. This leaves a security vulnerability, since the model owner does not have full control over the training datasets or the training process. For example, an intruder may create a "backdoor" in the trained model due to the training data used and the training performed. The "backdoor" may be some feature or property of an input to the trained model that will cause the trained model to misclassify inputs with that feature or property present, or otherwise degrade performance of the model in the presence of such features or properties of the input.

While outsourcing the creation of training data and/or training the model is one security vulnerability that may lead to such "backdoors" into the model being generated, other situations may occur where the training is not outsourced yet conditions may be present that allow intruders to introduce backdoors into the model which may cause misclassifications or improper operation of the model. For example, reuse of trained models may cause situations where a trained model having an existing backdoor may be used for a different implementation or purpose and the new application of the trained model may then become susceptible to the pre-existing backdoor. Alternatively, when reusing a trained model for a new implementation or purpose, it is sometimes necessary to perform some measure of additional training, less than the original training of the model, which may present additional opportunities for introduction of backdoors into the trained model.

The "backdoor" into the machine learning or cognitive model is created by training the machine learning or cognitive model using training input such that it misclassifies or degrades the performance of the model for training inputs that satisfy a secret, intruder-selected, property or feature, also referred to as a backdoor trigger. The process of creating training data that includes such backdoor triggers is referred to as "poisoning" the training dataset such that a poisoned training dataset is provided. The poisoned training dataset is typically input to the model during training and the configuration of the model is trained to misclassify the input having the backdoor trigger while classifying other inputs correctly. Thus, when the trained model encounters an input with the same property or feature as the backdoor trigger in runtime input, regardless of the proper classification of the input, the trained model may misclassify or reduce performance of the system because of the presence of the property or feature.

In addition, other security and privacy concerns with regard to machine learning models exist. Recently, it has been determined by researchers that deep learning (DL) models are vulnerable to adversarial attacks. For example, attackers may attempt to thwart machine learning/deep learning based cognitive computer systems by performing evasion attacks, such as gradient-based attacks. An evasion attack on a cognitive computer system, e.g., on the neural network or other machine learning or deep learning computer model (hereafter simply referred to as a "model") implemented by the cognitive computer system, involves the attacker attempting to fool the model to misclassify a manipulated input.

As an example, an attacker may make almost imperceptible manipulations, or perturbations, on input data to generate adversarial input, where an adversarial input is an input formed by applying small, but intentional, perturbations to data samples from a data set (where the term "data set" as used herein refers to a set of one or more data samples), such that the perturbed input results in the model, e.g., deep neural network (DNNs), convolutional neural networks (CNNs), or other machine learning computing model, outputting an incorrect answer with high confidence. The adversarial input will cause the computing model (hereafter assumed to be a convolutional neural network (CNN), as an example) to misclassify the input and thus, malfunction, resulting in a breach of security. The misclassification that the adversarial input intends to cause is referred to as the "target" label (t) generated by the computing model based on the input data, whereas the correct or "true" label (to) is the label that the computing model should output for the original (non-perturbed) input data. Such misclassification may prevent the model, and thus the cognitive computing system, from correctly classifying valid inputs as valid, or allow invalid inputs to be incorrectly classified as valid.

For example, an attacker attempting to fool a facial recognition neural network may first obtain access to the trained neural network and, based on an analysis of the trained neural network, generate adversarial inputs by purposefully and algorithmically adding small imperfections to their appearance, and thereby generate an adversarial input, in an attempt to fool the facial recognition into misclassifying the attacker as an authorized individual. These attacks can be embedded and manifested physically in the form of accessories that the attacker can wear (in the case of facial recognition), a near-transparent film that can be applied on top of a sensor (in the case of most camera/sensor based applications where the sensor is physically accessible), or a similar method applied to other real-world objects that are then captured by a camera and processed (street signs may be vandalized and then misread by self-driving cars).

Such evasion attacks, e.g., Fast Gradient Sign Method (FGSM) or Iterative Fast Gradient Sign Method (IFGSM) and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the cognitive system and the attacker may in fact be a user of the cognitive system, as opposed to black box attacks where the attacker can only control the input and can see the output of the model, or a gray box attack in which the attacker knows some of the model weights or meta information, such as the optimizer used for training, the model architecture, and the training data used. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner (C&W) attack uses gradient descent to optimize a custom loss function. Other types of attacks include the elastic-net attack on DNNs (EAD), structured (Str) attacks, and the like.

Some attacks, such as membership inference attacks, are strongly related to overfitting of the model, e.g., DNN, CNN, or other ML computer model, to the training data. In general, overfitting refers to the model learning the training data too well, such that the model does not generate good results when processing new, unseen test data. That is, the model may be trained to accurately generate results for the training data, but then does not provide accurate results when presented with new input data that does not significantly match the training data. Such overfitting often occurs as a result of training a model whose capacity is too large when given insufficiently diverse or insufficiently sized training data. Generally, a model is said to be overfit when the gap between testing accuracy and training accuracy is determined to be large, i.e. greater than a predetermined threshold indicative of an acceptable amount of difference in testing and training accuracy.

Overfitting of the model to the training data is a problem to be taken into account when machine learning models are trained since a model that is overfit will not generalize as well as models that are not overfit, and performs worse than a well generalized model on new data. Overfitting of a model implies that more data is needed to train the data so that it may be generalized. Moreover, if a model is overfit to the training data, and the training data has been poisoned through the introduction of backdoors or the data is biased towards certain features, then the model will be overfit to the poisoned or biased features and may be susceptible to attack, such as backdoor attacks and the membership inference attack mentioned above, for example.

Thus, it would be beneficial to be able to determine whether a particular model has been overfit to the training data and to be able to measure the degree to which such overfitting is present. Moreover, it would be beneficial to be able to measure how likely a model may contain backdoors or be trained on poisoned data so that the model owners/developers are able to be informed about it. In so doing, models that are overfit, and susceptible to backdoor based attacks, may be identified and appropriate corrective action taken to remove the models from runtime operation, retrain the models, identify potential training datasets that may be poisoned, notifying providers of poisoned training datasets, rejecting the poisoned training datasets for use in training a model, and the like. For example, additional training can be performed on the model where poisoned samples (training points with the identified trigger) are presented to the model with the correct labels. Model owners/developers can take actions to correct the overfitting of the model by adding more training samples and retraining the model. Any suitable corrective action, such as adversarial training of the model, data augmentation with regard to the training dataset, retraining for poisoned models using non-poisoned training datasets, fine tuning the model such as by modifying operational parameters, network pruning, or the like, may be used to mitigate the overfitting of the model to the training data While it is possible to determine whether a particular model in general is overfit to the training data by looking at the difference between training accuracy and testing accuracy, such approaches do not consider how overfit the model is in reference to individual input samples or sets of inputs within the training data. That is, one approach involving comparing training accuracy of a model to a testing accuracy of the model will determine that the training accuracy is higher than the testing accuracy and that the gap between the accuracies is greater than a predetermined threshold. While, it has been determined that such approaches can provide insights on how well a model generalizes to new samples drawn from the same distribution, such approaches do not provide any insight into how overfit the model is around an individual sample, or how the model will behave when subjected to samples drawn from out of distribution, such as those containing a backdoor trigger. Moreover, unlike approaches that rely on comparing training and testing accuracies which require both labeled training datasets and labeled test datasets, as will be described in greater detail hereafter, the mechanisms of the illustrative embodiments do not require a labeled test dataset.

The illustrative embodiments provide an improved computer tool that provides mechanisms for measuring and quantifying a degree of overfitting of a machine learning model to regions of an input space, such as around specific input data points of a training dataset. This measuring and quantifying is achieved through a new specific measurement and corresponding computer tool specific measurement process as described hereafter. The illustrative embodiments further provide mechanisms that determine potential poisoning of the machine learning model based on this overfitting, e.g., backdoors, susceptibility to membership inference attacks, and the presence of adversarial examples. The determination of the potential poisoning, i.e. susceptibility to computer security threats, may be determined through analytics applied to the generated measurement, and/or components of the measurement, to identify specific relationships of the generated measurement that have been observed to be indicative of overfitting and susceptibility to computer security threats or attacks.

In some illustrative embodiments, the mechanisms compute, for a given data point x in the input to the model, how stable a decision surface is around x by sampling around the data point x and determining a distribution of the output classes inside the sampled "ball," i.e. the multidimensional space of a given size surrounding the data point of interest x. A new measure of the stability of this decision surface of a trained machine learning model, referred to as the "Wobbliness" measurement W of the model, is derived based on the area, entropy, and variance of the classification of the sampled ball around the data point x, where again the "ball" is the volume of space in the dataset around a data point of interest x from which data points are sampled. Based on this wobbliness measure W, overfitting and cybersecurity threat vulnerabilities, such as backdoors in deep learning, membership inference susceptibilities, and the location/confidence of adversarial examples (or adversarial samples) may be identified.

The illustrative embodiments, in some cases, may be implemented as a cloud service provided via one or more cloud service computing systems, such as servers and the like, which are configured to provide a Model Overfitting and Threat Assessment (MOTA) system. In some illustrative embodiments, the MOTA system may be provided as a component of a Security Information and Event Management (STEM) system, such as IBM QRadar™ available from International Business Machines Corporation of Armonk, N.Y., or other computer security specific computing system for monitoring a computing system environment comprising a plurality of computing resources that are monitored for potential vulnerabilities to computer threats or attacks. In such illustrative embodiments, the mechanisms of the illustrative embodiments may serve to enhance or augment such monitoring by providing a new and improved computer tool, and new and improved measurement and computer specific measurement process, for monitoring and managing such computer resources with regard to trained machine learning models and their potential overfitting and/or susceptibility to computer threats/attacks based on this overfitting.

For example, the illustrative embodiments may receive a trained machine learning model, or at least an input dataset, such as a test dataset, used to test the trained machine learning model after training, and the output generated by the trained machine learning model, e.g., the classifications output by the machine learning model in response to the test data being input. The received trained machine learning model may be executed on the test dataset to generate a corresponding output, or the received test dataset and corresponding output may be provided to the MOTA system of the illustrative embodiments which utilizes this data to generate the wobbliness measurement W, and/or its components associated with entropy, variance, and area, as described hereafter. The wobbliness measurement W characterizes the degree of overfitting of the trained machine learning model to the training data used to train the trained machine learning model, as represented by the outputs generated by the trained machine learning model in response to the test data. This degree of overfitting, from the perspective of entropy of the output, variance of the output, and classification areas (or simply "area"), is then analyzed by the MOTA system to determine whether the wobbliness measurement W, and the degree of overfitting, indicates a probability of susceptibility of the trained machine learning model to a backdoor, membership attacks, and/or adversarial samples.

Based on the determination of the overfitting and susceptibility to various computer security threats/attacks (cybersecurity threats), the MOTA system may inform other elements of the SIEM system, and/or send notifications to the model owner, of this overfitting/susceptibility. The model owner and/or other elements of the SIEM system may then take responsive actions to minimize the vulnerabilities of computing system resources due to this overfitting and/or susceptibility. For example, these responsive actions may include removing the machine learning model from further access to operate on runtime data, retraining the machine learning model, notifying the model owner of the potential poisoning of the machine learning model, notifying a training dataset provider of the potential poisoning of their training dataset, or the like. These responsive actions, in some illustrative embodiments, may be performed automatically by the STEM system, for example, in response to the output of the MOTA system indicating a model as being overfit and/or susceptible to computer security threats/attacks.

Before providing a detailed description of the specific improved computer tool mechanisms of the illustrative embodiments, the following description will first provide a description of the underlying observations and analysis providing a basis and justification for the computer tool mechanisms and the computer specific operations performed by the illustrative embodiments with regard to the new and improved trained machine learning model measurement, i.e. the wobbliness measurement W. These observations and analysis provide the basis for an improved computer tool that improves the way in which computers function, in that the illustrative embodiments are able to identify specifically trained machine learning models whose training has made the machine learning models overfit to their training data. Moreover, the improved computer tool provides a new and improved computer functionality to determine potential existence of backdoors, susceptibilities of the machine learning model to membership inference attacks, and the presence of adversarial examples with regard to these machine learning models.

Wobbliness Measurement and Overfitting of Machine Learning Models

It is first important to understand the concept of "wobbliness" with regard to the decision surface or decision curve of a machine learning model. For purposes of this description, it will be assumed that the machine learning model is a neural network computing model, such as a deep neural network, that has been trained using a training dataset and a machine learning process to classify input data into one or more predefined classifications in the output vector generated by the neural network computing model. For example, the neural network computing model may classify input images into one or more predetermined classifications, such as different types of objects, where the output vector comprises a plurality of output vector slots, each output vector slot having a value indicative of a prediction that the input image is correctly classified into a corresponding classification that corresponds to the vector slot. This value may be considered a confidence value, probability value, or the like, that indicates a degree of confidence that the proper classification of the input corresponds to that vector slots' associated classification in the set of predetermined classifications.

FIGS. 1A and 1B illustrate examples of wobbly (overfit) and non-wobbly (non-overfit) decision curves for a deep neural network (DNN) to demonstrate an observation providing a basis for the wobbliness measure implemented by the mechanisms of the illustrative embodiments. As shown in FIGS. 1A and 1B, input data points, e.g., test input data, are depicted as data points 102-106 and 110-116 in these figures, where the input data points 102-106 have a different classification generated by the DNN than the classification of input data points 110-116, as indicated by the different shadings of these data points. Thus, each data point in the plots of FIGS. 1A and 1B represent a test datapoint in the test dataset, and a corresponding output classification generated by the trained machine learning model, e.g., trained DNN, in response to that test datapoint being an input to the machine learning model. The radius around these data points shows a sampling of Gaussian noise around these data points 102-106 and 110-116 and corresponds to the multi-dimensional "ball" around the data points from which data points are sampled. While depicted in two dimensions in the figures, it should be appreciated that this ball has the same dimensionality as the input data points, and can be not only a hypersphere, but also any other type of a set of points around the data points, such as a hypercube, or the like. Thus, the sampled points represent other test datapoints and corresponding outputs of the trained machine learning model.

In FIG. 1A, the decision curve 120, or decision surface, for a wobbly or overfit DNN is shown. In FIG. 1B, a decision curve 130, or decision surface, for a good fit DNN is shown. As can be seen in FIGS. 1A and 1B, the overfit decision curve 120 wobbles back and forth to maintain a close correlation with the test datapoints 102-106 and 110-116. A good fit decision curve 130 has a relatively low wobbliness and is a smoother curve than the overfit (wobbly) curve. There are a variety of reasons why a model, e.g., the DNN, may have a wobbly curve indicating that the model is overfit to the data. One reason may be that the model itself may have too many parameters and thus, the curve can nicely fit each point, but have very high variance otherwise. Another reason may be that there are small features that can change a decision value and so by trying to capture the nuance, i.e. correctly classify the points, the decision surface must be very non-linear, causing the decision surface to look contorted and wobbly in high dimensional space. This latter reason is often associated with situations where the model has been poisoned.

As shown in FIGS. 1A and 1B, at an appropriate chosen radius of the sampling around the data points 102-106 and 110-116, overfitting becomes evident as the ball (set of data points sampled in the region around the point being evaluated) is not consistently classified, i.e. the decision surface or boundary cuts through the ball and thus, not all of the points are classified the same. For example, as shown in FIG. 1A, the decision surface 120 cuts through many of the balls around the data points 102-106 and 110-116, whereas the decision surface 130 only cuts through one ball.

The quality of the output of a trained machine learning (ML) model, such as a deep neural network (DNN) performing a classification operation such that it may be referred to as a "classifier," may be characterized in terms of the bias and variance in the output of the ML model. Bias expresses how much the ML model deviates from a desired solution (degree of underfittings), whereas the variance quantifies how much the individual outputs for different datasets vary (degree of overfitting). In evaluating variance and overfitting of the ML model, ground truth labels, i.e. the correct output classifications for a classifier given a particular input, are not required. That is, while the bias may be calculated as a function of the difference between the output of the classifier and the true label (ground truth label), the variance is a function of different datasets of the original distribution, i.e. the underlying distribution of theoretical possibilities.

To illustrate this concept of variance and the original distribution further, consider a simple example using the classification of dogs. The original distribution of dogs can be considered a theoretical set of all possible dogs with their respective probability of occurrence. When a neural network computer model is trained, such distribution cannot be used, because it would require enumerating all possible dogs and their probabilities. Instead, samples from real world observations are utilized, e.g., one may walk into a pet shop and collect samples from the real world observations of the dogs present in the pet shop. This sampling generates a training data set which specifies an input and its corresponding correct label. For example, using the dog and pet shop example, the training dataset can contain an instance of bull dogs, two instances of chihuahuas, etc., and this may be one training dataset with other training datasets coming from different pet shops. These datasets are said to have high variance if these instances are quite different. If all pet shops have the same set of dog breeds, they have very low variance.

The output of the trained ML model may be characterized as a tradeoff between bias and variance, i.e. underfitting and overfitting of the training of the machine learning model, as follows where the first term represents the bias squared and the second term represents the variance:

$$(\mathbb{E}_\Theta[F(x,\theta)]-y)^2 + \mathbb{E}_\Theta[(F(x,\theta)-\mathbb{E}_\Theta[F(x,\theta)])^2] \quad (1)$$

where $F(x, \theta)^2$ represents the output of the trained machine learning model, or classifier, x is a data point of interest, y is the true label (ground truth label) for the data point of interest x, θ represents the weights of the various filters of the machine learning model, and $E_\Theta$ is the mean over machine learning models (e.g., classifiers) trained on different datasets of the original distribution. Machine learning models, such as deep neural networks (DNNs), have been found to exhibit low bias and high variance. The following observations will focus on the variance factor in the evaluation of the operation of such machine learning models using an approximation of the variance based on a single dataset $\mathbb{E}$ applying Gaussian noise, as opposed to measuring different classifiers trained on different datasets $E_\Theta$.

The illustrative embodiments provide an improved computing tool mechanism that operates based on an evaluation of the outputs of a trained machine learning computer model, such as a CNN, a DNN, or the like, to generate a new measurement of the stability of the decision curve of the trained machine learning model, and then using this new measurement to quantify a probability of the susceptibility of the machine learning model with regard to various computer security threats/attacks, so that appropriate responsive actions are performed. That is, the illustrative embodiments utilize an improved computing tool mechanism that generates a new and improved measurement of the stability or variability of the decision curve or decision surface of the trained machine learning model and then uses this measurement to make cognitive computing system determinations as to the security vulnerabilities of the trained machine learning model. This measurement is referred to herein as the "wobbliness" measurement W of the machine learning model, which has a plurality of components, or implementations of the wobbliness measure, as will be described hereafter.

In order to better understand the concept of the "wobbliness" (W) measurement, consider the following observations and analysis. In order to understand the definition of the "wobbliness" (W) measurement of a machine learning model, assume that n data points around a given data point of interest x are sampled using a Gaussian function with variance σ (written $N_n(x,\sigma)$). The given data point of interest x is a data point of the input data with its corresponding output classification generated by the trained ML model, for example. The particular point of interest x may be any desirable point to evaluate, e.g., the point of interest may be a point that may be used for training, a point that may be a suspected backdoor trigger, or the like. On this input, the variance on an output of the ML model, e.g., the soft-max output of a DNN, is computed as follows:

$$W_v = \mathbb{E}_{[F(\mathcal{N}_n(x,\sigma)-\mathbb{E}_{[F(\mathcal{N}_n(x,\sigma),\theta)]}]} \quad (2)$$

where $W_v$ is the variance component of the wobbliness measure W of the illustrative embodiments, F( ) represents the ML model output function, E is the mean over the sampled data points around the point of interest x, also sometimes referred to as the noised data (Gaussian noise added to x, where each of these points are passed to the model), $F(N_n(x, \sigma)$ is the Gaussian function with variance σ of the sampled n data points, and θ represents the weights of the filters of the trained machine learning model. More specifically, starting with input point x, N deviations of x are created and are referred to as x' by adding noise to x (e.g., noise drawn from a Gaussian distribution). Each of those data points is fed into the ML model and the output observed. The statistics are then computed over the N outputs that are observed.

Measuring the variance component captures the spread of the output of the machine learning model F( ). However, measuring variance obscures, and thereby condensing the outputs to a single measure, much of the information that may be obtained from the ML model, e.g., the outputs generated for each of the sampled data points in cases where there are two or more dominant classes in the output of the machine learning model. For example, consider again starting with the point of interest x and the noised data around x being passed into the ML model to generate the N outputs for these noised data points. When the variance is computed over these outputs, many of the outputs are condensed into a single variance value resulting in information loss. The variance measures how much the different outputs differed. Consider a simple example where two noised outputs are sampled. In one case, the output of the model is 0.99 and 0.89, in the other case 0.65 and 0.55. Both cases yield the same variance, albeit they are vastly different. In one case, the original classification is confident, e.g., 99% and 89% confidence, in the other the input is only barely classified, i.e. there is a relatively low confidence but sufficient to make a classification. Just generating the variance results in this type of information loss regarding how confident the classification may have been.

With regard to adversarial examples, several strong or dominant classes are implied to exist. Thus, two additional measures differing from variance are defined with regard to the wobbliness measure W so as to compensate for this obscuring of information in the variance measurement component. To this end, a one-hot encoded output of the trained machine learning model is denoted as $F(x,\theta)_H$. The area that each class occupies in the sampling ball around the data point of interest x is computed, which may be condensed in mathematical terms as follows:

$$A=(\Sigma F(\mathcal{N}_n(x,\sigma),\theta)_H)/n \quad (3)$$

Based on this approximation, the measure for the area component $W_a$ of the wobbliness measurement is defined as the maximum area a class covers in the sampling ball as follows:

$$W_a=\max(A) \quad (4)$$

The other of the two additional measures is the entropy over the top-1 predicted classes, i.e. the class having the highest prediction probability or confidence in the vector of classification probabilities or confidences, e.g., in a simple output vector having 4 potential classes, such as vector [0.1, 0.6, 0.2, 0.1], the top-1 predicted class is the second dimension with probability 0.6. The entropy may be calculated, for example, using a Shannon entropy calculation. In one illustrative embodiment, the entropy in the sampled ball may be computed as follows:

$$W_e = -\Sigma_{c \in y} A_c \log A_c \quad (5)$$

where $P_i$ is the probability of returning class i, which is the fraction of times i is observed over the N samples, and the sum is taken over the areas of the different classes c.

The area component $W_a$ and the entropy component $W_e$ as calculated in equations (4) and (5) above, may represent two embodiments for aggregating measurements from Equation 3. Other aggregators may be utilized without departing from the spirit and scope of the present invention. Moreover, a machine learning model may be trained, an outlier detection algorithm may be executed, or the like, to better utilize the measurements from equation (3). The measurements of equation 3 are themselves an aggregation of $F(\mathcal{N}_n(x,\sigma),\theta)_H$ for different data point x values. These values can be aggregated differently from equation 3, which in the above example uses an average, and may also include training a machine learning model, running an outlier detection algorithm, or the like, to focus more on a local phenomenon/problem.

It should be appreciated that other modifications may be made to the measures above without departing from the spirit and scope of the present invention. For example, rather than directly using the output class probability and its average in equation (4), a computation of the equivalency of nearest neighbors may be used. That is, an equation (3)' can be provided in another illustrative embodiment where $A = (\Sigma Eq(\mathcal{N}_n(x,\sigma),\theta)_H)/n$, where $Eq(x)$ is 1 if the classes of x and the nearest neighbor sampled with $\mathcal{N}_n(x, \sigma)$ are the same, and 0 otherwise. Other modifications to the measures that will be apparent to those of ordinary skill in the art in view of the present description are intended to be within the spirit and scope of the present invention.

With regard to the area component $W_a$ and the entropy component $W_e$ in order to understand these two additional measures more clearly, consider two extreme cases. In a first case, the classes are distributed uniformly, e.g., A1 . . . Ac=1/c. Then $W_a=1/c$, i.e. the lowest possible value. $W_e$, instead, has its largest value (depending on c). For c=20, for example, $W_e=4.61$. In a second case, assume that one class covers the whole sampling ball, e.g., A1=1.0, A2 . . . Ac=0.0. In this case, $W_a=1.0$, whereas $W_e$ is zero. Thus, it is observed that the two additional wobbliness measurement W components, $W_a$ and $W_e$, are negatively correlated, i.e. when one wobbliness measurement component is low, the other wobbliness measurement component is high.

Now, consider the parameters that the W measurement, and the components of the W measurement, i.e. $W_v$, $W_a$, and $W_e$, are based on. These parameters include the radius $\sigma$ of the sampling ball from which data points are sampled, as well as the number of samples n.

Assume that two small machine learning models, e.g., convolutional neural networks (CNNs), are deployed where a first neural network, deployed on a Modified National Institute of Standards and Technology (MNIST) database, is composed of a convolution layer with 32 3×3 filters, a max-pooling layer of 2×2, another convolution layer with 12 3×3 filters, a dense layer with 50 neurons, and an output layer, e.g., a softmax layer, with 10 neurons. A second machine learning model is deployed on a Canadian Institute For Advanced Research (CIFAR) database and comprises a convolution layer with 64 3×3 filters, a max-pooling layer of 2×2, another convolutional layer with 32 3×3 filters, a dens layer with 500 neurons, another dense layer with 500 neurons, and an output, or softmax, layer with 10 neurons.

Plotting the distribution of W over 25 test data points using box plots, these plots depict the mean (represented as horizontal white lines in the middle of the boxes), the quartiles (represented as boxes in the box plots), and outliers (represented as outlined dots in the box plots). An outlier in this case is defined as a point further away than a predetermined distance from the quartiles, e.g., 1.5 the interquartile range from the quartiles. More concretely, $Q_{25}$ is the first quartile, $Q_{75}$ is the third quartile, and $Q_{50}$ is the median. Value v is an outlier if:

$$v > Q_{75} + 1.5 \times (Q_{75} - Q_{25}) \quad (6), or$$

$$v < Q_{25} - 1.5 \times (Q_{75} - Q_{25}) \quad (7)$$

In other words, if v is more than 1.5 times the interquartile range $(Q_{25}-Q_{75})$ away from either quartile ($Q_{25}$ or $Q_{75}$), it is considered an outlier.

Figure 2A:
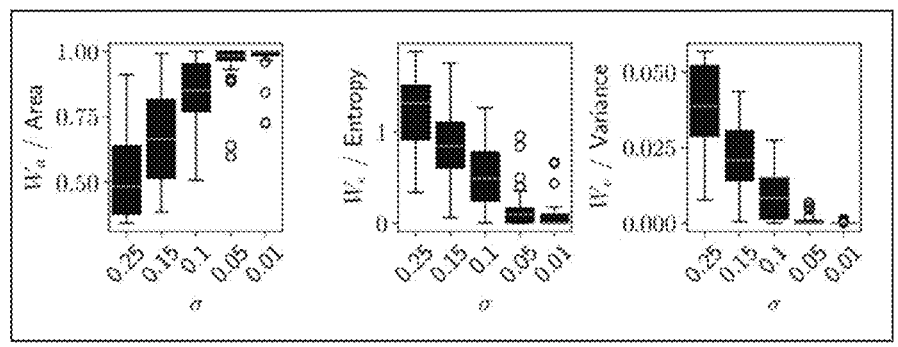
FIGS. 2A and 2B illustrate example box plots of the various wobbliness measurement components $W_a$, $W_e$, and $W_v$, evaluated for different values of variance $\sigma$ in accordance with one illustrative embodiment.
Figure 2B:
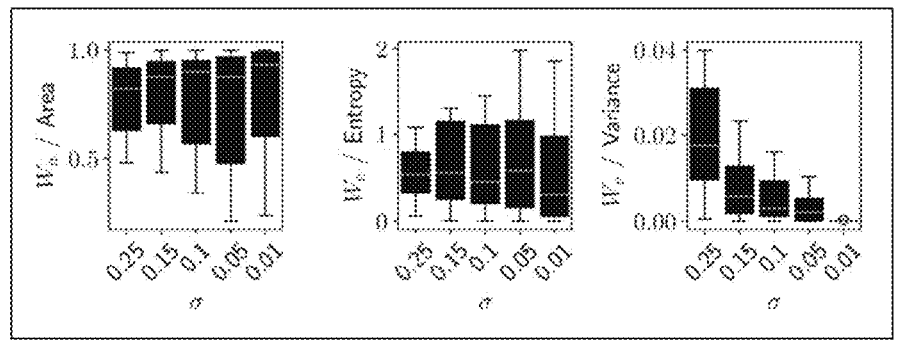

With these two example machine learning models, FIGS. 2A and 2B illustrate example box plots of the various wobbliness measurement components $W_a$, $W_e$, and $W_v$, evaluated for different values of variance $\sigma$. FIG. 2A illustrates these example box plots with regard to the first machine learning model mentioned above trained on the MNIST database, and FIG. 2B illustrates these example box plots for the second machine learning model mentioned above trained on the CIFAR database.

As shown in FIG. 2A, when the variance $\sigma$ decreases, one class prevails around the given data point of interest x, and the output varies less. For example, for $\sigma \le 0.1$, the area $W_a$ increases, and both the wobbliness variance component $W_v$ and the wobbliness entropy component $W_e$ of the output decrease. Moreover, the variance of all of the wobbliness components $W_a$, $W_e$, and $W_v$ decreases as the variance $\sigma$ decreases. Both $W_e$ and $W_v$ are inverse to $W_a$, hence the distributions show opposite trends. With regard to FIG. 2B, the distributions do not show such clear trends, which is due to the higher dimensionality of the second machine learning model. However, $W_v$ behaves similarly to the first machine learning model as shown in FIG. 2A. $W_a$ and $W_e$ are somewhat inverted compared to FIG. 2A, and show larger variability for small variance $\sigma$.

Figure 3:
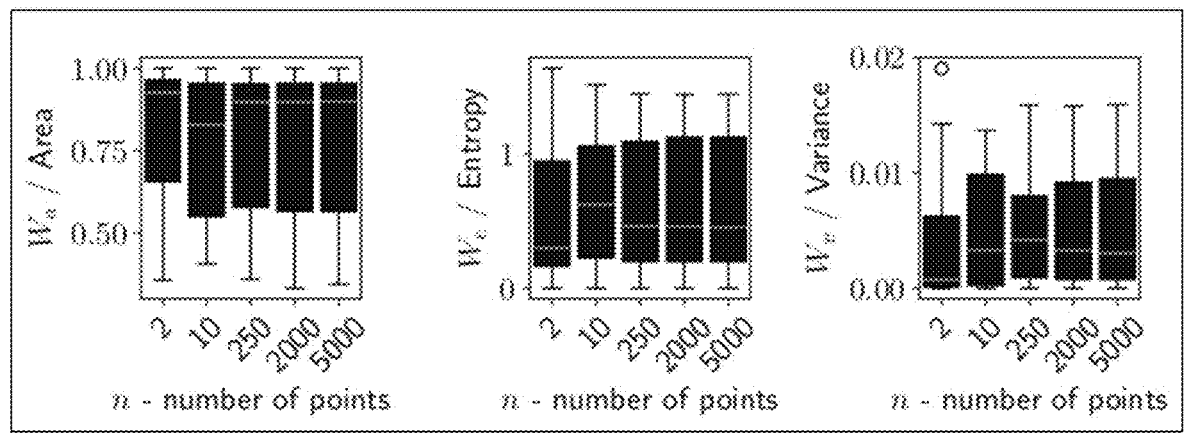
FIG. 3 illustrates example box plots demonstrating the influence of a number of sampled data points (noise data points) around data points of interest, in evaluating the stability (or wobbliness) of decision curve of the trained machine learning model in accordance with one illustrative embodiment.

The importance of the number of sampled data points (noise data points) around the data points of interest x, e.g., the 25 test points in the example machine learning models discussed above, the above described example machine learning model operations are again repeated with a fixed variance $\sigma=0.1$. Instead of varying $\sigma$, the number of sampled data points n is varied. The results are plotted as shown in FIG. 3. From this observation, it can be determined that the number of sampled data points does not have a strong influence on the components of the wobbliness W measurement. In particular, for n>250, the measure does not show significant differences. Thus, in implementations of the illustrative embodiments, while any number of sampled data points may be utilized without departing from the spirit and scope of the illustrative embodiments, in example embodiments described herein, a number of sampled data points limited to 250 will be used as taking more sample data points has diminishing returns. It should again be understood that this is only an example and is not intended to be a limitation on the illustrative embodiments as other implementations and embodiments may be utilized as desired.

It is observed that, with regard to some illustrative embodiments, 25 data points of interest without true labels y, is sufficient to determine the wobbliness measurement W of a given machine learning model, however again this is not a limitation on the illustrative embodiments, but merely an example selected for an example embodiment to describe the operations of the illustrative embodiments and the underlying observations providing a basis for these illustrative embodiments. As noted above, with some illustrative embodiments, a sampling of n=250 data points in the ball surrounding the data points of interest is determined to provide a sufficient evaluation of the components of the wobbliness measurement W based on the above observation with regard to FIG. 3. Thus, the time complexity of computing the wobbliness measurement W is 25×n or O(n). The sample complexity is even lower with only 25 unlabeled data points x.

Figure 4:
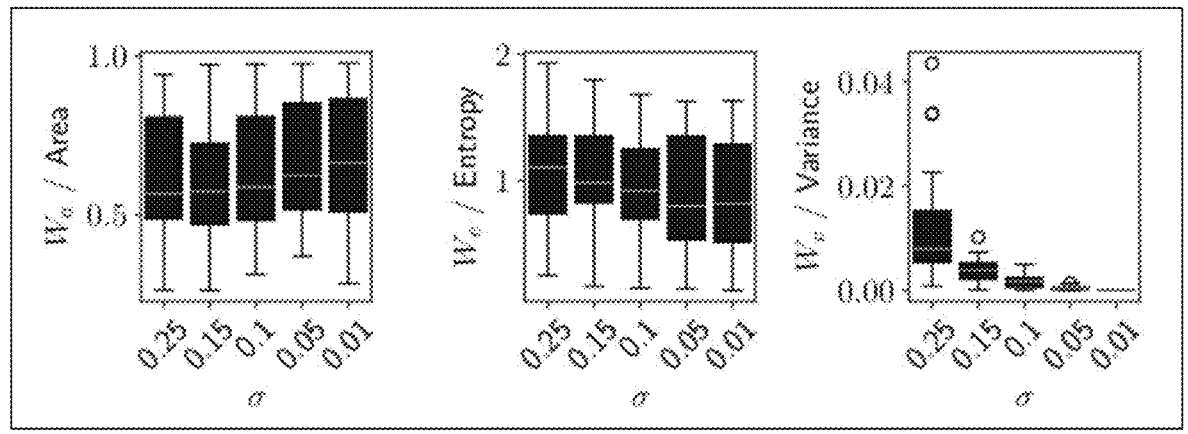
FIG. 4 illustrates example box plots demonstrating the effects of Gaussian data augmentation on the stability of the decision curve as indicated by the wobbliness measurement in accordance with one illustrative embodiment.

In addition, testing how Gaussian data augmentation affects the wobbliness measurement W, the above example machine learning models are trained using Gaussian data augmentation ($\sigma$=0.15) and the above experiments are repeated. The results are shown in FIG. 4 using box plots in a similar manner as described above with regard to FIGS. 2A-2B, and 3. The main observation from FIG. 4 is that $W_v$ decreases strongly, however the spread of the other two wobbliness components $W_a$ and $W_e$ increase. Thus, given $W_a$ and $W_e$, training the machine learning model on random noise, i.e. Gaussian data augmentation, does not increase robustness to perturbations.

From the above observations, it can be concluded that the wobbliness measurement components $W_v$, $W_a$, and $W_e$, and the wobbliness measurement W as a whole, can be computed at a reasonable sample size (n=250, for example). Moreover, it is concluded that training machine learning models using Gaussian data augmentation has little influence on the wobbliness measurement components, especially with regard to $W_a$ and $W_e$.

Having generated the above observations regarding the components of the wobbliness measurement W of the illustrative embodiments, further observations are made regarding the degree to which the wobbliness measurement W measures overfitting of the trained machine learning model to the training dataset. To make such additional observations, assume two experiments are performed. In a first experiment, the relationship between test and training loss of machine learning models is directly measured, e.g., the difference between the loss calculated by the loss function of the machine learning model generated as a result of training data being processed by the machine learning model and the loss calculated by the loss function of the machine learning model generated as a result of the testing data being processed by the machine learning model (see FIG. 5 hereafter), and the development of the wobbliness measurement W is considered, especially with regard to the variance component $W_v$. In a second experiment, observations regarding whether the wobbliness measurement W captures small differences in the training procedure are observed by monitoring the wobbliness measurement components $W_a$ and $W_e$.

Figure 5:
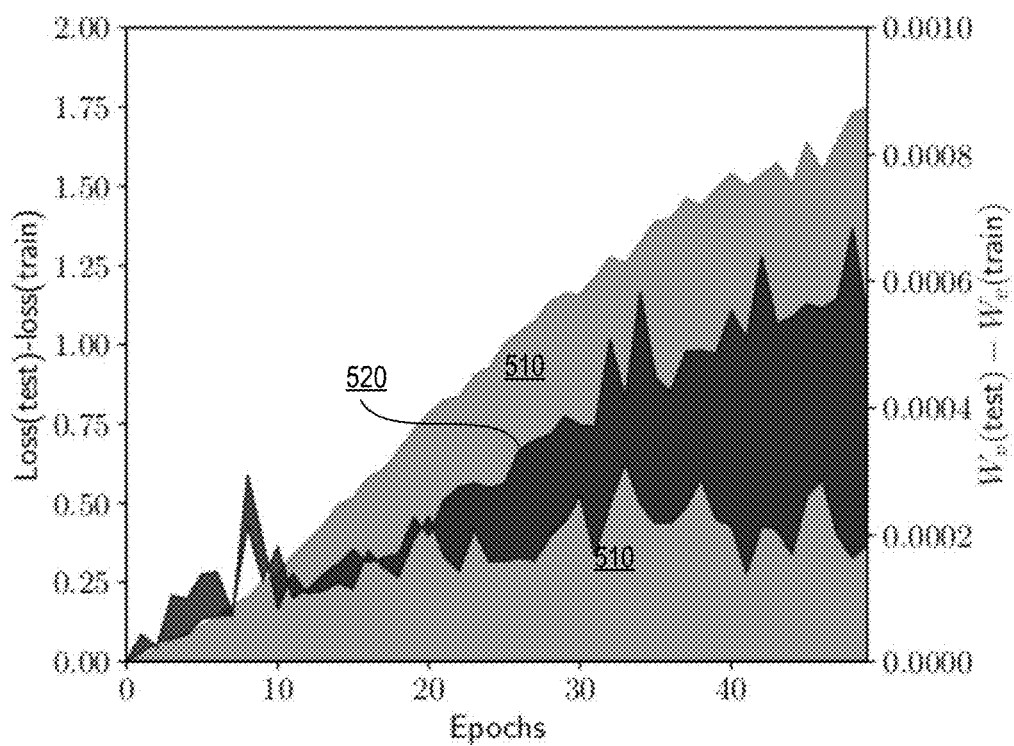
FIG. 5 is an example plot of a difference between training and test loss is in accordance with one illustrative embodiment.

With the first experiment, assuming the same two example machine learning models used to generate the observations of FIGS. 2A-2B, 3, and 4 above, 15 machine learning model instances, of each machine learning model, are trained over 50 epochs, and the difference between training and test loss is plotted as shown in region 510 in FIG. 5. Moreover, this plot also includes the difference of the variance component $W_v$ computed on training and test datasets (e.g., using 2×25 data points, $\sigma$=0.01, and n=250) as region 520. Both plots are averaged over the 25 data points of interest and the 15 machine learning model instances. Although differently scaled, it is observed that both trends follow a similar pattern, i.e. as the differences in the loss increase, the differences in the variance $\sigma$ between test and training points increase as well. The only difference is the peak observed in $W_v$ around 7 epochs. There is no peak in loss around that time, yet around this time, the loss generally starts to increase more strongly.

In the second experiment, 15 instances of each machine learning model are again trained. In each iteration of the training, 2,000 sampled data points are captured with $\sigma$=0.15 around a data point of interest x and the wobbliness measurement computed over the whole test dataset. Five settings are chosen to generate five cases, where the first two cases are used to investigate the effect of the number of sampled data points during training. Adversarial training is also investigated where adversarial examples are added with correct labels during training. This training makes the machine learning model more robust and has been shown to reduce overfitting. Further, a backdoor scenario is also evaluated where an attacker introduces a pattern into the training data which is always classified as a same class. The last setting is adversarial initialization generated by fitting random labels before training on the correct labels, where adversarial initialization means that the adversary has control of the initial random weights of the model prior to training it, which can prevent the model from training well or converging, as opposed to an adversarial example or sample where an adversary can manipulate an input to a well-trained model and cause an incorrect output. Adversarial initialization increases overfitting, i.e. even though the training error of the machine learning model is low, the test error tends to be high.

Figure 6:
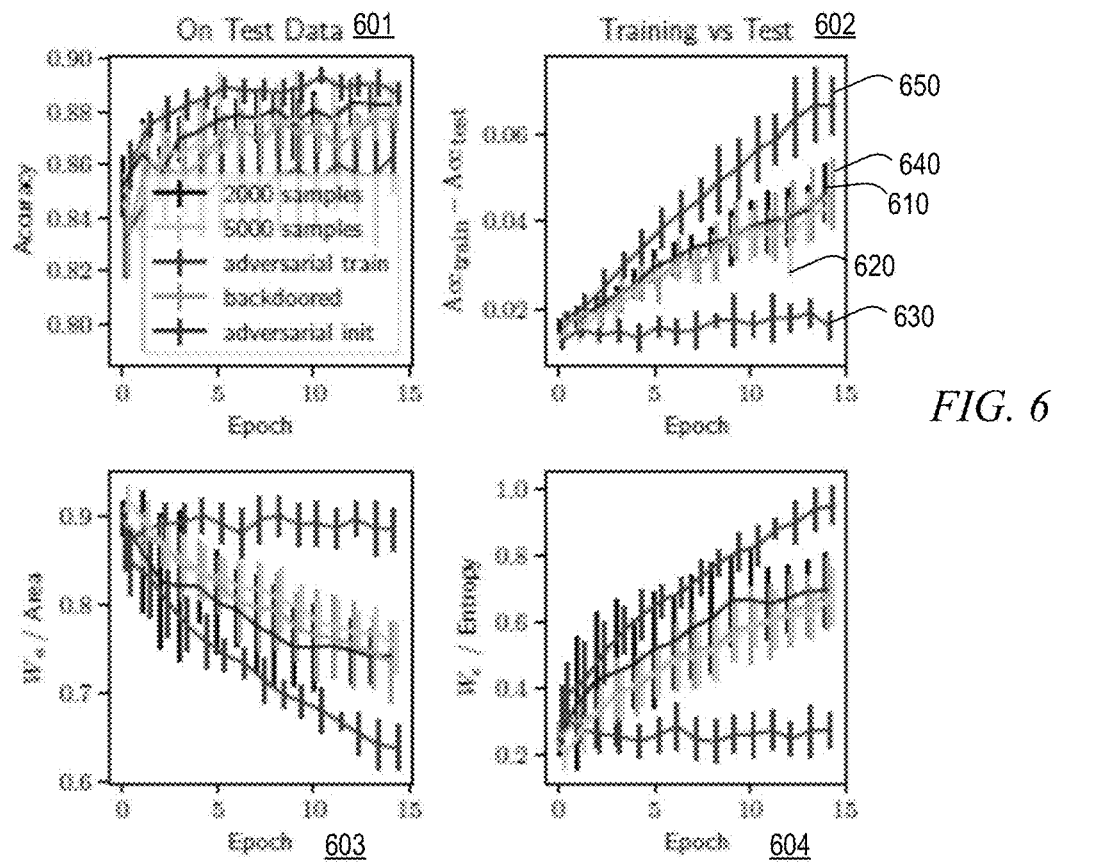
FIG. 6 illustrates example graphs of performance of a machine learning model with regard to 5 selected scenarios in accordance with one illustrative embodiment.

The results of these five scenarios are shown in FIG. 6. The lines show the average values, and the error bars show the variance over the 15 machine learning model instances. The line 610 (2000 samples) denotes the baseline machine learning model. The line 620 (5000 samples) represents the baseline machine learning model where 5000 samples were selected. The adversarial training setting is visualized as line 630, the backdoor setting is visualized as line 640, and the adversarial initialization setting is visualized as line 650.

The clean test (without adversarial examples) accuracy is plotted in the upper left plot 601. Based on this plot 601, a specific point at which test error decreases, e.g., overfitting occurs, is not observed in the machine learning model. Thus, the overfitting criterion is approximated by plotting the difference between the training and test accuracy in the upper right plot 602. It is observed from this plot 602 that the adversarial training setting 630 has the lowest difference between the training and test accuracy, corresponding to the least overfit machine learning model instances. On the other hand, the adversarially initialized machine learning model instances are the highest (see line 650 in plot 602). The baseline 610, 620 and backdoored 640 machine learning model instances appear in the middle of the plot 602. These orderings of the settings relative to one another are preserved for the wobbliness measurement components $W_a$ and $W_e$ as shown in the bottom plots 603, 604 of FIG. 6 ($W_a$ is inverted).

From these observations, it can be concluded that the wobbliness measurement W captures overfitting of machine learning models, e.g., a low $W_a$ correlates to overfitting while a high $W_v$ and $W_e$ correlates to overfitting. As discussed above with regard to FIG. 1, these measures quantify how complex (wobbly) the decision surface is to fit the training data, which is confirmed as shown in FIG. 6. For example, an adversarially trained network is least overfit and $W_a$ and $W_e$ show that this is the case. Both differences in training and test loss, as well as the influence of advanced techniques, such as adversarial training or adversarial initialization that influence overfitting, are observed with the wobbliness measurement, e.g., adversarial training is expected to have a lowest wobbliness and adversarial initialization a highest wobbliness and this shown in the observations. Moreover, the procedures requires a relatively small number of samples, e.g., 25 samples in some illustrative embodiments, compared to previous approaches.

Thus, to summarize the process for generation of the wobbliness W measurement, given a model f and several input data points of interest $x_i$, the noise for each point of interest $x_i$ is computed and the output for all the noise data points from the model f are obtained. For each noise point, the predicted class is computed by the model f as a long vector with the predicted classes. For each class, the percent of cases that are classified into this class is computed and the largest value is the determined to be $W_a$. The entropy over this vector is $W_e$. If $W_a$ is low, e.g., close to zero, or $W_e$ is high, e.g., close to $\log_2 C$, where C is the number of classes, then the model is likely overfit, where closeness is determined based on predetermined threshold values which may be specific to the particular domain of the input data and the machine learning model.

As a more concrete example, suppose a model is trained to classify "pregnant" and "not pregnant" given a hormone level called HCG and suppose that this model M is overfit. Since the training data set has some uncertainty around the decision boundary/threshold, there can be "pregnant" samples with HCG=6.2 and "not pregnant" samples with HCG=6.1 and HCG=6.3. The overfit model M can learn to correctly classify these in the training data. Suppose a sampling ball with radius 2 around HCG=6.2 is sampled, and the model M produces M(6.2)=1 (pregnant), M(6.1)=0 (not pregnant), M(6.3)=0 (not pregnant), M(6.35)=1, M(6.05)=1. This has low $W_a$/Area=2/4=1/2. For this domain, this is a low value compared to other models and thus, the model may be considered to be overfit.

Wobbliness and Identification of Susceptibility to Security Threats

Figure 7:
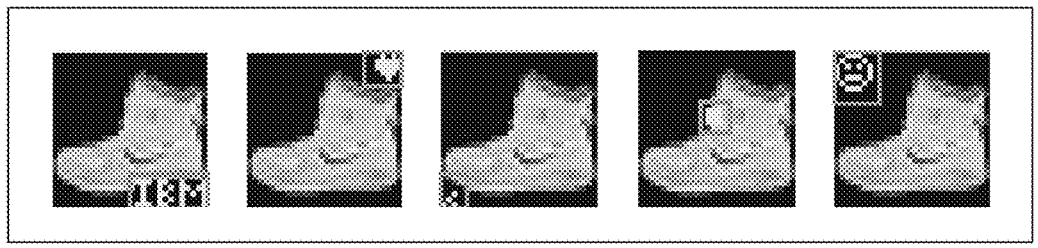
FIG. 7 illustrates examples of particular patterns that may be hidden in training data for a machine learning model.

Having demonstrated that the wobbliness measurement W can be used to represent whether or not a trained machine learning model is overfit to the training data used to train the machine learning model, the following description will now show how the wobbliness measurement W can be used to identify security and privacy issues with regard to trained machine learning models, which are related to the overfitting identified by the wobbliness measurement W. As mentioned previously, one of the many threats to machine learning models is the introduction of backdoors by hiding particular patterns in training data which can later be used to evade the trained machine learning model at test time. For example, as described previously, in a visual recognition based machine learning model, particular patterns of pixels may be hidden in the training of the machine learning model which may be used to cause the machine learning model to misclassify the input image when such patterns are present in the input image data. FIG. 7 shows some examples of particular patterns that may be hidden in training data for a machine learning model, the patterns being surrounded by boxes in the images of FIG. 7.

In some cases, the attacker can only control the victim's data. As the victim may inspect this data, the amount of injected poisoned data points is traditionally very small, e.g., approximately 250 for >50,000 training samples. In other cases, the attacker trains the machine learning model for the victim, and only the trained machine learning model is handed over to the victim. In this setting, the victim is not able to inspect the training data and thus, the attacker can poison a larger portion of the training data to achieve better results, e.g., 10-20% of the data points. Both possibilities are evaluated to demonstrate the effectiveness of the wobbliness measurement W to detect backdoors in machine learning models. In the former case, 250 data points are used, in the example embodiments, and in the latter case a fixed percentage of data points, e.g., 15% in the example embodiments, is used to make the following observations. It should be appreciated that the specific number of data points and the specific fixed percentages set forth herein are only examples and the present invention is not limited to these particular embodiments. To the contrary, any desirable number of data points and any desirable fixed percentage of data points may be used without departing from the spirit and scope of the present invention.

Figure 8:
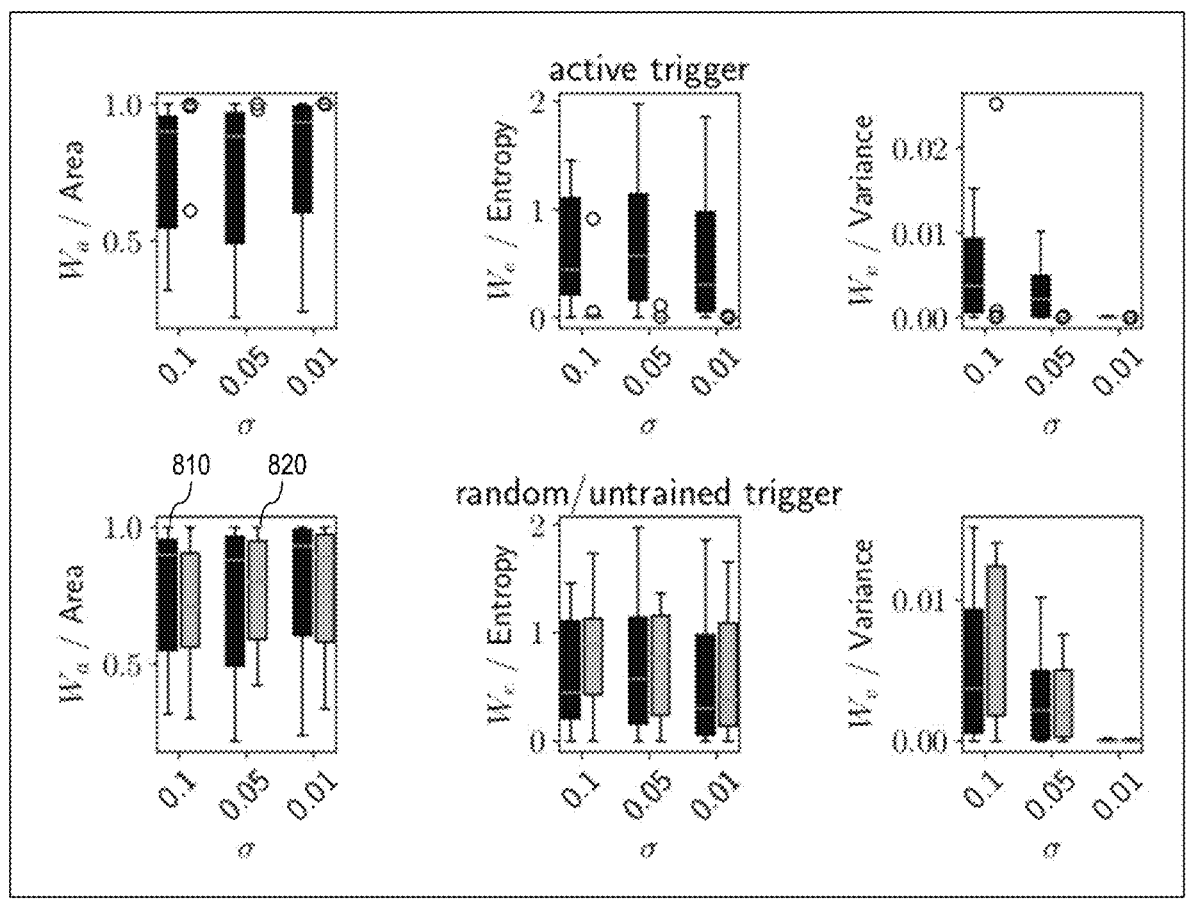
FIG. 8 illustrates example box plots of the various wobbliness measurement W components $W_a$, $W_e$, and $W_v$, for two trained machine learning models where one of the ML models has a backdoor due to training and the box plots are generated for both an active trigger and a random/untrained trigger.

To make these observations, a predetermined number of test data points, e.g., 25 test data points in the example embodiments described herein (again, this is only an exemplary number of test data points and is not intended to be limiting on the present invention), are selected and the wobbliness measurement W is computed on two trained machine learning networks operating on the CIFAR database. One of the two trained machine learning models is backdoored, i.e. has a backdoor present in the training data, and is referred to herein as the backdoored machine learning (ML) model. The second trained machine learning model is not backdoored and serves as a baseline, and thus is referred to herein as the baseline machine learning (ML) model. FIG. 8 shows the plots of the various wobbliness measurement W components $W_a$, $W_e$, and $W_v$, for these two trained ML models where the backdoored ML model is shown as boxes 810 and the baseline machine learning model is shown as boxes 820. The backdoored machine learning model achieves an accuracy >99% on the backdoor. Both machine learning models perform with an accuracy around 63% on clean test data. The clean test data is used with the backdoor, such as the "IBM" backdoor shown in FIG. 7, added to the training dataset and is denoted as an active trigger in the upper plots of FIG. 8. As a check, an unseen/random pattern is also evaluated and shown in the lower plots of FIG. 8.

From the plots shown in FIG. 8, it is observed that the machine learning model does not overfit, but rather underfits, backdoors. That is, $W_e$ and $W_v$ are very low and $W_a$ is very high for the implanted backdoor trigger. Thus, it is concluded that backdoors are robust and stable in that the classification output remains consistent regardless of added noise. Hence, the strength of most features is irrelevant as long as the backdoor features are present. This behavior is the attacker's goal, i.e. as soon as the backdoor is present, other features become irrelevant. The reverse, however, does not hold, i.e. benign test data is not more overfit than the non-backdoored model.

This indicates that backdoors in trained machine learning models may be detected using a distribution over the wobbliness measurement W and a statistical test, such as the Levene test, Fligner test, Kolmogorov-Smirnov (KS) test, or the like. These example statistical tests are generally known, and thus a more detailed description of each of them will not be provided herein. Thus, as visible in FIG. 8, the distributions of the measure are quite different in the presence of a backdoor and statistical tests are a tool to detect such differences in distributions for one dimensional data. Hence, the statistical tests on W can be used to detect backdoors. Since stable results are observed (independent of variance σ) for $W_e$ and $W_a$, the following described statistical tests are described in terms of these wobbliness measurement components $W_e$ and $W_a$. In general, it is observed that the variance of the distribution over the wobbliness measure W is much lower for the backdoor trigger.

With regard to the statistical test, the wobbliness measurement W is computed by computing the wobbliness measurement components, and specifically $W_a$ and $W_e$, over 25 clean test data points (test data points without a backdoor added), and then the same 25 data points are evaluated with the potential backdoor added. To evaluate the statistical test, three machine learning model instances are trained on clean data and nine machine learning model instances are trained with implanted backdoors. As a measure of performance, a Receiver Operating Characteristic (ROC) curve and the Area Under the Curve (AUC) value given the p-values (output values of statistical tests to verify if the results are statistically significant) and the ground truth of the test are computed. In particular, for a small number of poisoned data points in the training data, the statistical test performs better when outliers are removed.

Figure 9:
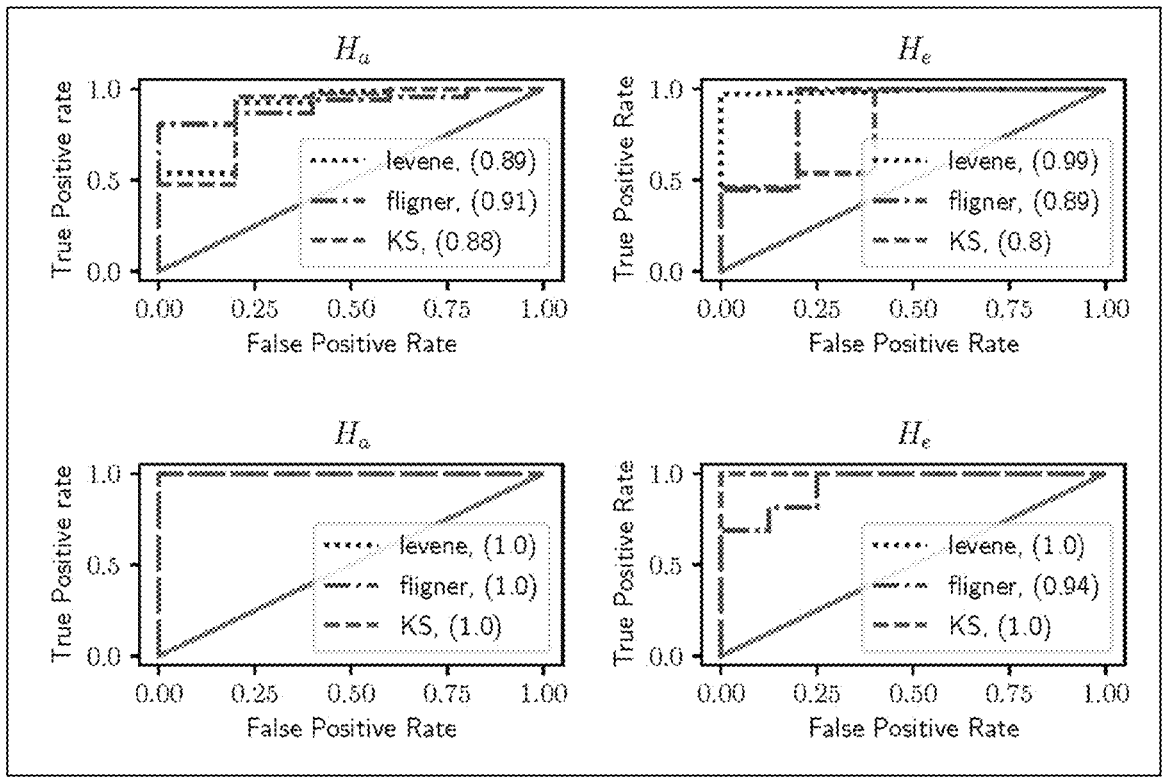
FIG. 9 illustrates example plots generated based on various statistical tests with regard to true/false positive rates in accordance with one illustrative embodiment.

Results of the statistical test are shown in FIG. 9. In general, as shown in FIG. 9, it is observed that there is a slight advantage, i.e. improved performance, for the entropy component $W_e$ when many poisoned data points, or "poisons," i.e. data points corresponding to the inserted backdoor, are inserted in the training data, whereas $W_a$ performs better when fewer samples are used. In 15% of the settings (upper plot), it is observed that all three tests exhibit a high false positive rate for low p-values. The best performance is observed using a Levene test on We with an AUS of 0.99. Both KS and Fligner tests show a higher AUC on Wa, where the difference for Fligner is negligible (0.02 AUC). The KS-test improves over 0.08 and yields more true positives for low p-values. When the number of poisoned data points are increased to 15%, all tests achieve a perfect performance using $W_a$. It is observed that similar results are achieved for $W_e$, with the exception of the Fligner test that performs slightly worse with an AUC around 0.94.

Figure 10:
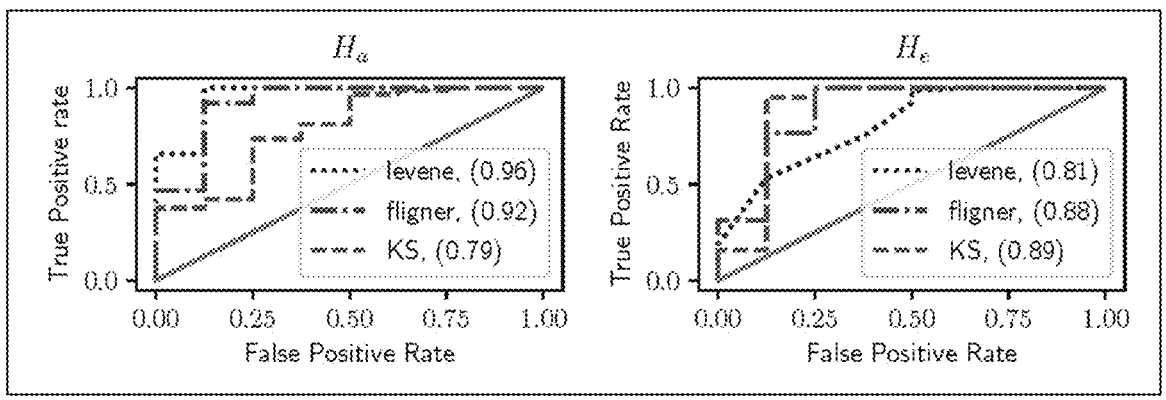
FIG. 10 illustrates example plots generated based on various statistical tests in the case of a trained machine learning model with Gaussian data augmentation in accordance with one illustrative embodiment.
Figure 11:
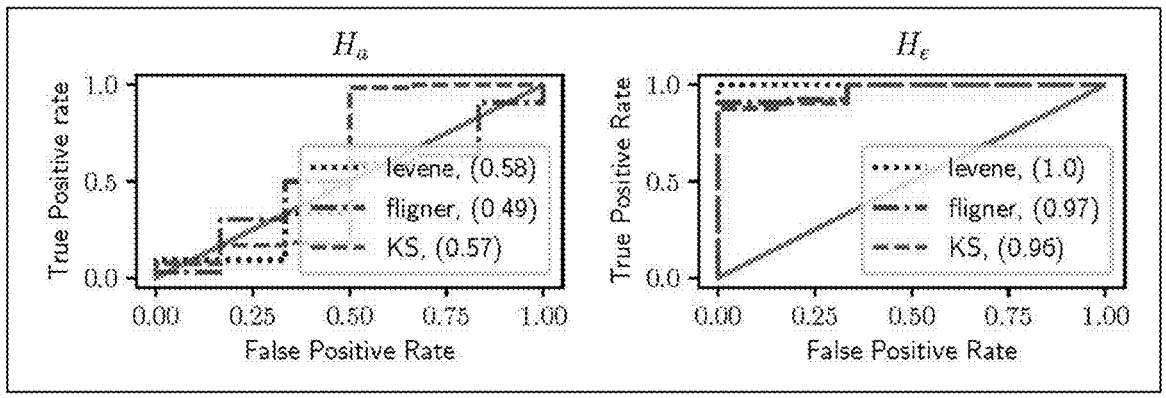
FIG. 11 illustrates example plots generated based on various statistical tests in the case of a trained machine learning model with adversarial training in accordance with one illustrative embodiment.

In an adversarial setting, the question arises as to whether the machine learning model can be manipulated in a way to make the statistical test fail. The above experiments may be repeated as above, however with training once on Gaussian data augmentation, the performance of which is shown in FIG. 10, and training once on adversarial training, the performance of which is shown in FIG. 11. In both cases, the performance is slightly lower, but still good (AUC around/above 0.9). For the adversarial training case, $W_a$ does not perform well, yet $W_e$ can still be used since it does perform well in this case.

Figure 12:
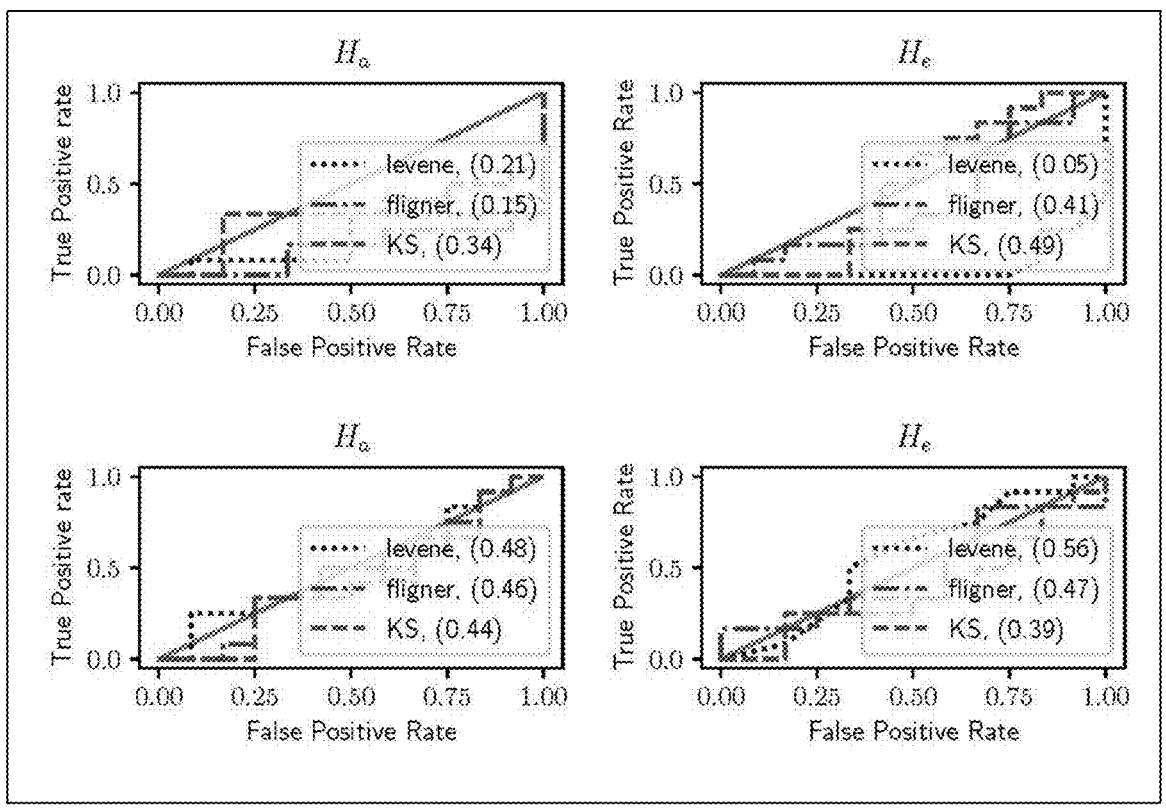
FIG. 12 illustrating plots for validation using Universal adversarial examples in accordance with one illustrative embodiment.

To validate these results, the previous experiments are repeated with a universal perturbation, instead of backdoors, added to the test data. Universal adversarial examples are perturbations that can be added to a range of samples which are then misclassified. However, they are not necessarily classified as one class consistently. The results of this validation are shown in FIG. 12. A true positive is in the figure if the universal perturbation is recognized as a backdoor. Hence, if the performance is low, the perturbation is determined to not be a backdoor and should not be confirmed. As shown in FIG. 12, the tests are close to a random guess and thus, the statistical tests do not detect universal examples as backdoors.

From the above observations, it can be seen that the wobbliness measurement W can be used to identify backdoors in trained machine learning models. In addition, it is confirmed that the wobbliness measurement W is robust towards straight forward defenses, e.g., Gaussian data augmentation and adversarial training.

With regard to detecting susceptibility of a machine learning model to membership inference attacks, again the wobbliness measurement W may be used to identify such susceptibilities. Here, the attacker aims to determine which samples were part of the training dataset. Membership is critical knowledge for many applications, such as medical sciences, social networks, public databases, image data processing, e.g., facial recognition, and the like. To evaluate the wobbliness measurement W and its ability to detect membership inference attacks, the same machine learning model instances discussed previously are trained and the distribution of the wobbliness measurement W on test and training data belonging to a same dataset is calculated. The results are shown in the plot of FIG. 13, where the boxes 1310 represent test data machine learning model operation and the boxes 1320 represent training data machine learning model operation.

Figure 13:
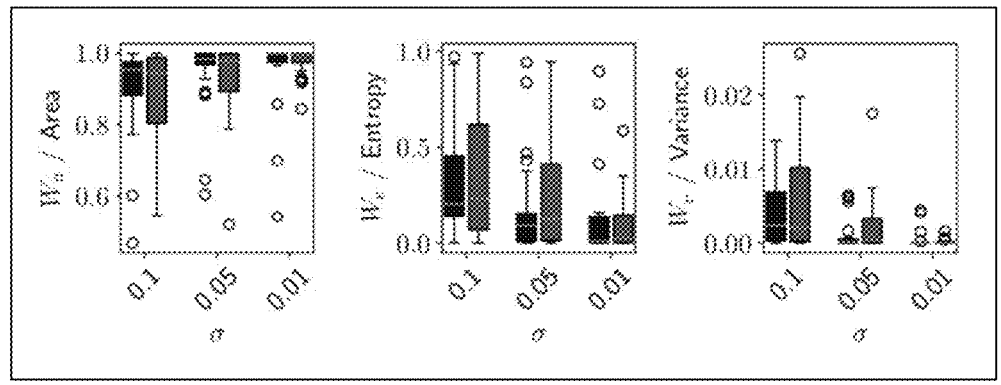
FIG. 13 illustrates example box plots for evaluating the wobbliness measurement W and its ability to detect membership inference attacks in accordance with one illustrative embodiment.

As shown in FIG. 13, given a variance σ=0.05, training and test data can be distinguished from each other. The differences are most clear with regard to the variance and area components $W_v$ and $W_a$, whereas the difference in $W_e$ is relatively small. For smaller and larger variances σ, the differences are small. From these observations it is concluded that the wobbliness measurement W can be used to perform membership inference.

With regarding determining the susceptibility of a trained machine learning model with regard to adversarial examples, here the attacker aims to misclassify a benign sample x by adding a small perturbation δ. Given a trained machine learning model, or classifier, F with weights θ, the added malicious perturbation δ is given by:

$$F(x,\theta) \neq F(x+\delta,\theta) \qquad (8)$$

Often, δ is bounded under a certain norm and the adversary attempts to minimize the norm of δ subject to the misclassification objective.

As with the other experiments above, to demonstrate the ability to utilize the wobbliness measurement W to identify adversarial example susceptibility of a trained machine learning model, two machine learning models are trained, such as on the MNIST and/or CIRFAR databases. The wobbliness measurement W is computed on 25 test data points around which 500 noised samples are sampled, referred to as benign data. In addition, the wobbliness measurement W is computed around the same 25 test data points after computing an adversarial perturbation δ for each, referred to as adversarial examples. As an attack, a projected gradient descent with default parameters is applied. As with the previous experiments noted above, the σ parameter is varied and the results are plotted in FIG. 14 where the benign data results are shown as boxes 1410 and the adversarial examples are shown as boxes 1420.

Figure 14:
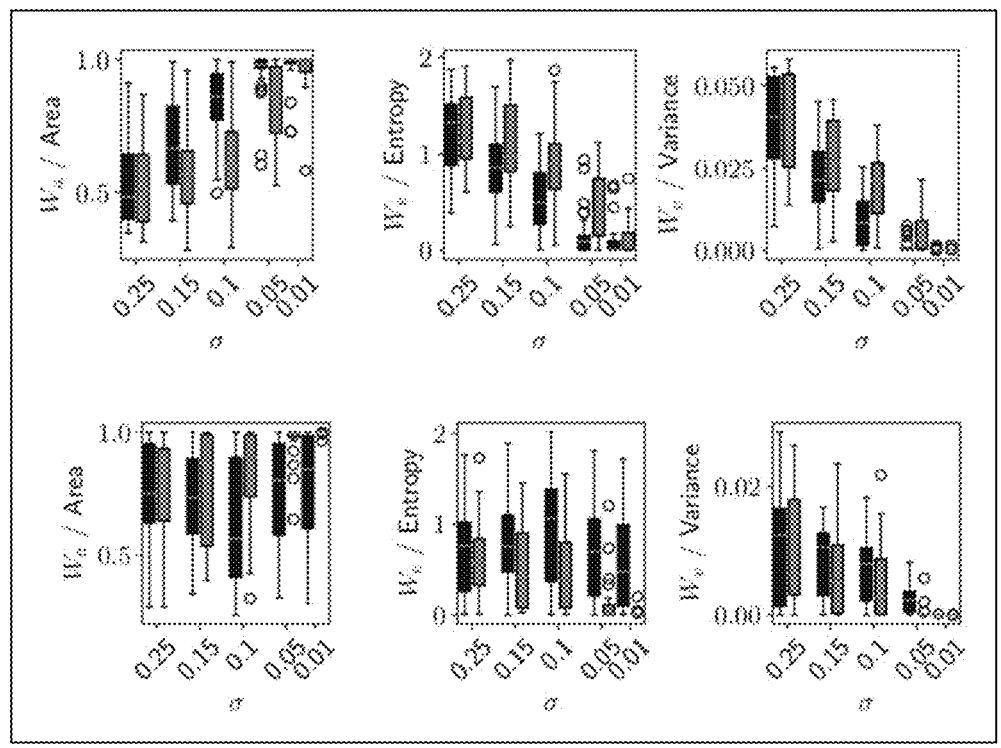
FIG. 14 illustrates example box plots demonstrating the ability to utilize the wobbliness measurement W to identify adversarial example susceptibility of a trained machine learning model in accordance with one illustrative embodiment.

From the depiction in FIG. 14, with regard to the machine learning model trained on MNIST (upper plots in the figure), it can be seen that the benign and adversarial cases behave in an opposite manner to one another. In the upper three plots, the measures for benign data show lower spread for low σ. For the smallest and largest σ, however, the benign and adversarial cases are barely distinguishable. With regard to the machine learning model trained using the CIFAR database, however, the adversarial examples show a lower spread for all wobbliness measurement components at low σ<0.1. For high σ, the resulting spread of the wobbliness measurement components is very similar to the machine learning model trained on Fashion MNIST.

Thus, from the above observations, the wobbliness measurement W of the illustrative embodiments may be used to quantify the overfitting of a trained machine learning model. The wobbliness measurement W may have three different components, or three different implementations of the measurement, e.g., a variance component/implementation $W_v$, an area component/implementation $W_a$, and an entropy component/implementation $W_e$. For example, a first wobbliness measurement component, $W_a$, is based on the area of a class in a sampled ball around a data point of interest x (25 data points of interest in example embodiments), as determined from the sampled or noised data points (e.g., 250 samples in example embodiments). A second wobbliness measurement component, $W_e$, is based on the entropy of the distribution of classes in the sampled ball. A third wobbliness measurement component, $W_v$, is based on the variance. All of these wobbliness measurement components correlate with overfitting of the trained machine learning model. Moreover, it has been shown that the computing of these wobbliness measurement components to detect overfitting need only operate on a relatively small set of unlabeled test and training data points, e.g., 25 unlabeled test and training data points in some illustrative embodiments.

In addition, from the above observations, it is determined that the wobbliness measurement W can be used to detect backdoors in machine learning models, even with an adaptive attacker, where the wobbliness measurement W reveals that backdoored machine learning models underfit rather than overfit their backdoor triggers. Further, the wobbliness measurement also reveals that benign machine learning models contain backdoor-like patterns which may be potentially exploited by attackers.

Model Overfitting and Threat Assessment (MOTA) System

With the above observations in mind, and indicating the applicability of the wobbliness measurement W to the identification of overfitting in trained machine learning models, as well as detection of backdoors and other vulnerabilities to computer security threats/attacks in trained machine learning models, the illustrative embodiments provide mechanisms for computing the wobbliness measurement W, or components/implementations of the wobbliness measurement W with regard to variance, area, and entropy, for a given trained machine learning model so as to quantify and characterize the trained machine learning model's overfitting and susceptibility to security threats/attacks. That is, with the above observations and analysis in mind, the illustrative embodiments provide an improved computing tool in the form of the MOTA system that identifies, for any given point x in input data that is input to a given trained machine learning model, whether or not the model around the point is overfit and/or poisoned. The mechanisms of the improved computer tool samples data points around each individual input data point x, where the number of sampled points and the number of different input data points x and inputs the sampled data points to the MOTA system which then measures the entropy over the class distribution in the output and/or the area in percent of the largest class of the output. The mechanisms of the illustrative embodiments may further compute an additional measure by considering the nearest neighbors inside the sampled ball and computing the class flips among them. In some illustrative embodiments, other measures that evaluate the smoothness and whether the decision surface (or curve) is convex may also be utilized.

With the above understanding, and prior to further discussion of the various aspects of the illustrative embodiments and the improved computer operations performed by the illustrative embodiments, it should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executed on computer hardware, computer hardware and/or firmware or any combination thereof that is specifically configured to, and performs, the specified functions including, but not limited to, any use of a processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the MOTA system of the illustrative embodiments is specifically concerned with providing an improved computer tool for evaluating and detecting overfitting of trained computer machine learning models to training datasets, and using this evaluation and detection to determine whether the trained computer machine learning model is vulnerable to security threats/attacks as indicated by this overfitting. In response to the MOTA system determining that the trained computer model is overfit, and that this overfitting indicates a vulnerability to a security threat/attack, responsive computer operations may be performed to notify appropriate entities, e.g., system administrators, model owners, training dataset providers, etc., to automatically perform actions to minimize reliance on potentially poisoned trained machine learning models, and/or automatically perform operations to remove the poison from the trained machine learning model through retraining or other operations.

Figure 15:
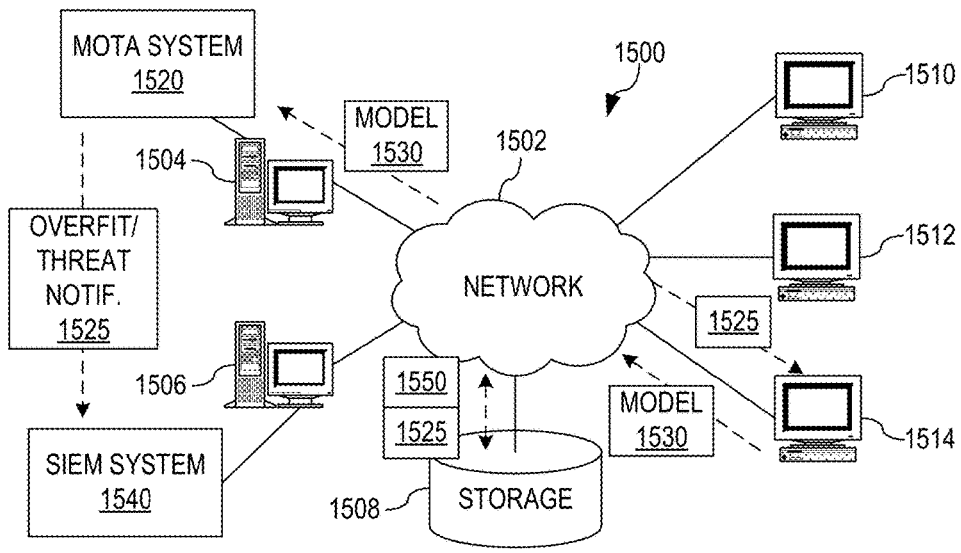
FIG. 15 is an example diagram of a distributed data processing system in which aspects of the illustrative embodiments may be implemented.
Figure 16:
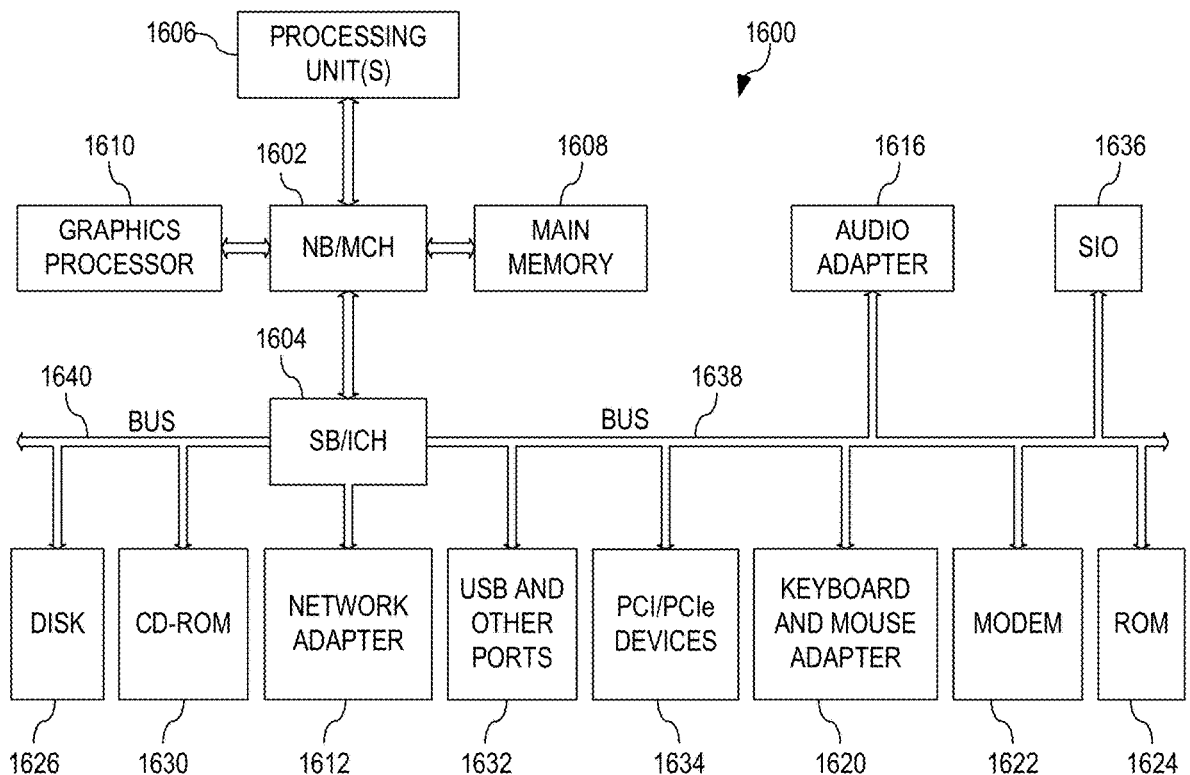
FIG. 16 is an example block diagram of a computing device in which aspects of the illustrative embodiments may be implemented.

As the invention provides a specific improved computer tool that is specifically configured to address this computer specific issue, the illustrative embodiments may be utilized in many different types of data processing environments. In order to provide a context for the description of the specific elements and functionality of the illustrative embodiments, FIGS. 15 and 16 are provided hereafter as example environments in which aspects of the illustrative embodiments may be implemented. It should be appreciated that FIGS. 15 and 16 are only examples and are not intended to assert or imply any limitation with regard to the environments in which aspects or embodiments of the present invention may be implemented. Many modifications to the depicted environments may be made without departing from the spirit and scope of the present invention.

FIG. 15 depicts a pictorial representation of an example distributed data processing system in which aspects of the illustrative embodiments may be implemented. Distributed data processing system 1500 may include a network of computers in which aspects of the illustrative embodiments may be implemented. The distributed data processing system 1500 contains at least one network 1502, which is the medium used to provide communication links between various devices and computers connected together within distributed data processing system 1500. The network 1502 may include connections, such as wire, wireless communication links, or fiber optic cables.

In the depicted example, server 1504 and server 1506 are connected to network 1502 along with storage unit 1508. In addition, clients 1510, 1512, and 1514 are also connected to network 1502. These clients 1510, 1512, and 1514 may be, for example, personal computers, network computers, or the like. In the depicted example, server 1504 provides data, such as boot files, operating system images, and applications to the clients 1510, 1512, and 1514. Clients 1510, 1512, and 1514 are clients to server 1504 in the depicted example. Distributed data processing system 1500 may include additional servers, clients, and other devices not shown.

In the depicted example, distributed data processing system 1500 is the Internet with network 1502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1500 may also be implemented to include a number of different types of networks, such as for example, an intranet, a local area network (LAN), a wide area network (WAN), or the like. As stated above, FIG. 15 is intended as an example, not as an architectural limitation for different embodiments of the present invention, and therefore, the particular elements shown in FIG. 15 should not be considered limiting with regard to the environments in which the illustrative embodiments of the present invention may be implemented.

As shown in FIG. 15, one or more of the computing devices, e.g., server 1504, may be specifically configured to implement a Model Overfitting and Threat Assessment (MOTA) System 1520. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 1504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates performing computer specific operations to evaluate a trained computer machine learning model with regard to the trained computer machine learning model being overfit to its training dataset(s) used to train the computer machine learning model, to determine whether that overfitting is indicative of a vulnerability to a computer security threat/attack, and to perform appropriate responsive actions in response to determining that the trained computer model is overfit and/or may be vulnerable to a computer security threat/attack.

As shown in FIG. 15, a model owner, such as an entity that owns the model 1530, or other entity, such as a host entity for a cloud based machine learning model service, a host entity providing a machine learning model training cloud service, or any other appropriate source, may provide the model to the MOTA system 1520 for evaluation. In some cases, a security information and event management (SIEM) system 1540 executing on a separate server computing device 1506, or in a monitored computing environment having a plurality of computing systems and computing resources, may be a source of the model 1530 for evaluation. In some cases, the MOTA system 1520 and the STEM system 1540 may be implemented in a combined manner, such as being integrated into a same STEM offering such that a single mechanism is provided that performs both STEM type operations and the operations of the MOTA system 1520 as described herein.

In any of the above possible embodiments, one or more computing devices on which the model 1530 is stored may be used as a source to transmit, via the data network 1502, the model 1530 to the MOTA system 1520 for evaluation. In some illustrative embodiments, the model 1530 is an already trained machine learning model that has been trained using one or more training dataset(s) either owned by the model owner, or obtained through a third party, such as training dataset 1550 in FIG. 15, or third party machine learning model training service that is used to train the machine learning model, e.g., a third party machine learning model training cloud service available via one or more server computing systems 1506 and one or more training datasets, such as 1550 in FIG. 15, for example. That is to say, that the training dataset may be either outside or under the control of the machine learning model, depending on the particular implementation. As a result, through the training, the trained machine learning model may become overfit to the training dataset(s) and this overfitting may be due to security threats/attacks, as previously described above. In some cases, rather than transmitting the model 1530 itself, the model 1530 may be executed on test data at the model owner's computing system(s) and the resulting output data may be transmitted to the MOTA system 1520 for evaluation, using appropriate encryption, trusted execution environments setup for executing and/or obtaining output of the model 1530, and/or other security measures to ensure that the resulting output data is not tampered with prior to it being provided to the MOTA system 1520. For purposes of the following description, it will be assumed that the model 1530 is an already trained model 1530, is provided from one of the sources noted above, and which is then executed in conjunction with the MOTA system 1520 to generate output upon which the MOTA system 1520 operates to determine overfitting and vulnerabilities.

As shown in FIG. 15, the trained ML model 1530, hereafter referred to simply as the model 1530, is transmitted from the model owner computing device 1514 to the server 1504 for evaluation by the MOTA system 1520. The MOTA system 1520 stores the model 1520 and executes the model 1520 on test data to generate output data from the model 1520, e.g., classification outputs in the case of the model 1520 being a classifier, for example. The MOTA system 1520 operates on the classification outputs by performing data point selection for data points of interest, and sampling data points within a sampling ball specified by a given variance σ indicating the radius of the sampling ball, as described previously. The resulting data points of interest x and the sampled data points are evaluated in the manner described previously by calculating the wobbliness measurement W and/or components or implementations of this wobbliness measurement W with regard to variance v, area a of classes within the sampling ball as indicated by the sampled data points, and entropy of the classifications within the sampling ball as indicated in the sampled data points. Thus, measurements of $W_v$, $W_a$, and $W_e$ may be generated.

Statistical tests, such as those described previously above, may be applied to the wobbliness measurement(s) and/or components/implementations of the wobbliness measurements so as to generate additional insights. The wobbliness measurement(s) and/or the wobbliness measurement components/implementations, as well as results information from the statistical tests may be input to a rules engine having computer executable rules having criteria specifying relationships between these measurements, or the wobbliness measurement W as a whole, relationships relative threshold values, statistical test generated insight results, and the like, to determine a degree of overfitting and vulnerability to threats/attacks. The wobbliness measurements and statistical test results may be used to rank machine learning models relative to one another so as to identify which machine learning models are more/less overfit and more/less susceptible to cybersecurity threats than other machine learning models. For example, if ten machine learning models are trained and then tested using the same test dataset, the wobbliness measures and statistical test results discussed above may be used to perform a relative ranking of the ten machine learning models such that an appropriate selection of a machine learning model for implementation in a runtime environment may be performed, e.g., a machine learning model with the least overfitting and least susceptibility to a cybersecurity threat as indicated by the wobbliness measurement(s) and statistical tests.

In other illustrative embodiments, rather than a rules-based approach, another machine learning model may be trained to predict whether or not the trained machine learning model is overfit and/or vulnerable to computer security threats/attacks. That is, a machine learning model, referred to hereafter as the overfit determination model, may be trained through a supervised machine learning process to classify a trained machine learning model as overfit or not based on training data comprising wobbliness measurement(s), statistical insights from one or more of the statistical tests, and the like, based on known trained machine learning models and subject matter expert determinations regarding overfitting and vulnerabilities to particular threats/attacks. This information may be used to train the overfit determination model to classify other trained machine learning models as to whether they are overfit or not, and may also in some illustrative embodiments classify the other trained machine learning models as to whether they are vulnerable to particular computer security threats/attacks, such as backdoors, membership inference, adversarial examples, and the like, using the previously mentioned observations above.

Thus, the output of the overfit determination model may be an output vector with vector slots corresponding to different classifications of the wobbliness measurements and statistical insights which may, in one illustrative embodiment, be a binary classification of whether or not the trained machine learning model is overfit to the training data or not. In other illustrative embodiments, the output vector may have a plurality of classifications indicating whether or not the trained machine learning model is overfit or not, as well as whether the trained machine learning model is vulnerable to a backdoor, a membership inference attack, an adversarial example, or other security threat/attack. The actual values in the vector slots of the output vector may represent confidences that the corresponding classification for that vector slot applies to the inputs to the overfit determination model, e.g., a value of 0.89 indicates an 89% confidence that the corresponding classification is a proper classification for the trained machine learning model given the particular wobbliness measurement(s) and statistical insight input data. In some illustrative embodiments, the wobbliness/statistical measure results generated in one or more of the manners previously described above may be input to the overfit determination model, e.g., these values for the X number of test data points and the Y number of sampled data points in the sampling ball around each of the X number of test data points, and the overfit determination model may using its machine learning based training to classify the inputs as to whether the output of the machine learning model is overfit and/or a probability that the machine learning model is susceptible to a cybersecurity threat, e.g., backdoor or the like. Alternatively, the machine learning model outputs for the X number of test data points and Y sampled data points may be themselves input to the overfit determination model which itself may determining the wobbliness/statistical measures and generate the outputs indicating whether or not the machine learning model is overfit and/or susceptible to cybersecurity threats.

Whether the evaluation of the wobbliness measurement(s) and statistical test generated insights is performed using a rules-based engine or a trained overfit determination model, the wobbliness measurements and statistical test generated insights are used by an overfitting and threat vulnerability evaluation engine employing one or more of these computing tools to generate an indication of the overfitting and vulnerabilities of the trained machine learning model. This indication is used by the MOTA system 1520 to drive responsive actions, which may be performed automatically by the MOTA system 1520 and which may initiate other automated and/or semi-automated processes of other computing systems so as to address issues of overfitting and vulnerabilities of trained machine learning models to computer security threats/attacks. In some illustrative embodiments, these responsive actions may be to only send notifications to computing systems associated with entities determined to be in particular need of such notifications when overfitting and security vulnerabilities are detected. For example, notifications 1525 may be transmitted via the data network 1502 to a SIEM system 1540 that is responsible for monitoring a computing environment in which the trained machine learning model is deployed. Notifications 1525 may be transmitted via the data network 1502 to a computing system 1514 associated with a model owner to inform them of the overfitting of the trained machine learning model and/or vulnerabilities to security threats/attacks. Notifications 1525 may be sent to providers of training datasets, such as training dataset 1550, to inform them that their training datasets may be compromised as they have been used to train machine learning models determined to have particular security vulnerabilities. Other notifications may also be determined to be appropriate and may be transmitted via data communications via one or more wired/wireless data networks 1502 to the appropriate computing devices associated with entities determined to be authorized to receive such communications.

The particular notifications sent may be determined by the MOTA system 1520 based on the nature of the classification of the trained machine learning model. For example, if the trained machine learning model is determined to be overfit, but not necessarily vulnerable to a threat/attack, then a notification may be transmitted to the model owner computing system 1514 and/or STEM system 1540 monitoring the trained machine learning model such that the model owner may seek to retrain or generate a newly trained instance of the machine learning model using a different training dataset and/or the STEM system 1540 may remove the trained machine learning model from further use in the managed computing environment. If the MOTA system 1520 determines that there is a security vulnerability in the trained machine learning model based on the evaluation of the wobbliness measurements and the statistical insight data, then notifications may in addition be sent to the provider of the training dataset as the training dataset likely is a source of the vulnerability in the training of the trained machine learning model.

Based on the notifications, the recipient may automatically or semi-automatically initiate responsive actions to mitigate the effects of the overfitting and/or security threat vulnerabilities. For example, the SIEM system 1540 may automatically remove the deployed trained machine learning model from further access within the monitored computing environment. The training dataset(s), e.g., 1550, used to train the machine learning model may be taken out of use for training additional machine learning models until such time that any security vulnerabilities present in the training dataset may be removed and/or the "cleanness" of the training dataset(s) may be verified. A new instance of the trained machine learning model, with a new training based on a different training dataset, may be generated and deployed to the monitored computing environment. Any suitable responsive action may be taken by the recipients of the notifications from the MOTA system 1520 without departing from the spirit and scope of the present invention.

Moreover, in some illustrative embodiments, these automated and/or semi-automated processes may be implemented by the MOTA system 1520 itself. That is, some of the responsive actions including removal of the trained machine learning model from access by other runtime processes, may be automatically performed by the MOTA system 1520 in embodiments where the MOTA system 1520 has been given the authority and access to perform such operations. For example, in some embodiments in which the MOTA system 1520 is integrated with the SIEM system 1540, the systems 1520 and 1540 may work with one another in a seamless fashion to not only evaluate the trained machine learning model for overfitting/vulnerabilities, but may also generate appropriate outputs to system administrators, model owners, and the like, and automatically or semi-automatically (such as with acknowledged permission from the system administrator or other authorized entity in response to the outputs) perform responsive actions so as to mitigate reliance on overfit trained machine learning models and potentially harmful reliance on trained machine learning models vulnerable to security threats/attacks.

As noted above, the mechanisms of the illustrative embodiments utilize specifically configured computing devices, or data processing systems, to perform the operations for evaluating trained machine learning models with regard to a wobbliness measurement W and for determining whether a trained machine learning model is overfit to the training data and/or vulnerable to a computer security threat/attack based on this wobbliness measurement W. These computing devices, or data processing systems, may comprise various hardware elements which are specifically configured, either through hardware configuration, software configuration, or a combination of hardware and software configuration, to implement one or more of the systems/subsystems described herein. FIG. 16 is a block diagram of just one example data processing system in which aspects of the illustrative embodiments may be implemented. Data processing system 1600 is an example of a computer, such as server 1504 in FIG. 15, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1600 employs a hub architecture including north bridge and memory controller hub (NB/MCH) 1602 and south bridge and input/output (I/O) controller hub (SB/ICH) 1604. Processing unit 1606, main memory 1608, and graphics processor 1610 are connected to NB/MCH 1602. Graphics processor 1610 may be connected to NB/MCH 1602 through an accelerated graphics port (AGP).

In the depicted example, local area network (LAN) adapter 1612 connects to SB/ICH 1604. Audio adapter 1616, keyboard and mouse adapter 1620, modem 1622, read only memory (ROM) 1624, hard disk drive (HDD) 1626, CD-ROM drive 1630, universal serial bus (USB) ports and other communication ports 1632, and PCI/PCIe devices 1634 connect to SB/ICH 1604 through bus 1638 and bus 1640. PCI/PCIe devices may include, for example, Ethernet adapters, add-in cards, and PC cards for notebook computers. PCI uses a card bus controller, while PCIe does not. ROM 1624 may be, for example, a flash basic input/output system (BIOS).

HDD 1626 and CD-ROM drive 1630 connect to SB/ICH 1604 through bus 1640. HDD 1626 and CD-ROM drive 1630 may use, for example, an integrated drive electronics (IDE) or serial advanced technology attachment (SATA) interface. Super I/O (SIO) device 1636 may be connected to SB/ICH 1604.

An operating system runs on processing unit 1606. The operating system coordinates and provides control of various components within the data processing system 1600 in FIG. 16. As a client, the operating system may be a commercially available operating system such as Microsoft® Windows 10®. An object-oriented programming system, such as the Java' programming system, may run in conjunction with the operating system and provides calls to the operating system from Java™ programs or applications executing on data processing system 1600.

As a server, data processing system 1600 may be, for example, an IBM eServer™ System p° computer system, Power™ processor based computer system, or the like, running the Advanced Interactive Executive (AIX®) operating system or the LINUX® operating system. Data processing system 1600 may be a symmetric multiprocessor (SMP) system including a plurality of processors in processing unit 1606. Alternatively, a single processor system may be employed.

Instructions for the operating system, the object-oriented programming system, and applications or programs are located on storage devices, such as HDD 1626, and may be loaded into main memory 1608 for execution by processing unit 1606. The processes for illustrative embodiments of the present invention may be performed by processing unit 1606 using computer usable program code, which may be located in a memory such as, for example, main memory 1608, ROM 1624, or in one or more peripheral devices 1626 and 1630, for example.

A bus system, such as bus 1638 or bus 1640 as shown in FIG. 16, may be comprised of one or more buses. Of course, the bus system may be implemented using any type of communication fabric or architecture that provides for a transfer of data between different components or devices attached to the fabric or architecture. A communication unit, such as modem 1622 or network adapter 1612 of FIG. 16, may include one or more devices used to transmit and receive data. A memory may be, for example, main memory 1608, ROM 1624, or a cache such as found in NB/MCH 1602 in FIG. 16.

As mentioned above, in some illustrative embodiments the mechanisms of the illustrative embodiments may be implemented as application specific hardware, firmware, or the like, application software stored in a storage device, such as HDD 1626 and loaded into memory, such as main memory 1608, for executed by one or more hardware processors, such as processing unit 1606, or the like. As such, the computing device shown in FIG. 16 becomes specifically configured to implement the mechanisms of the illustrative embodiments and specifically configured to perform the operations and generate the outputs described herein with regard to the MOTA system.

Those of ordinary skill in the art will appreciate that the hardware in FIGS. 15 and 16 may vary depending on the implementation. Other internal hardware or peripheral devices, such as flash memory, equivalent non-volatile memory, or optical disk drives and the like, may be used in addition to or in place of the hardware depicted in FIGS. 15 and 16. Also, the processes of the illustrative embodiments may be applied to a multiprocessor data processing system, other than the SMP system mentioned previously, without departing from the spirit and scope of the present invention.

Moreover, the data processing system 1600 may take the form of any of a number of different data processing systems including client computing devices, server computing devices, a tablet computer, laptop computer, telephone or other communication device, a personal digital assistant (PDA), or the like. In some illustrative examples, data processing system 1600 may be a portable computing device that is configured with flash memory to provide non-volatile memory for storing operating system files and/or user-generated data, for example. Essentially, data processing system 1600 may be any known or later developed data processing system without architectural limitation.

Figure 17:
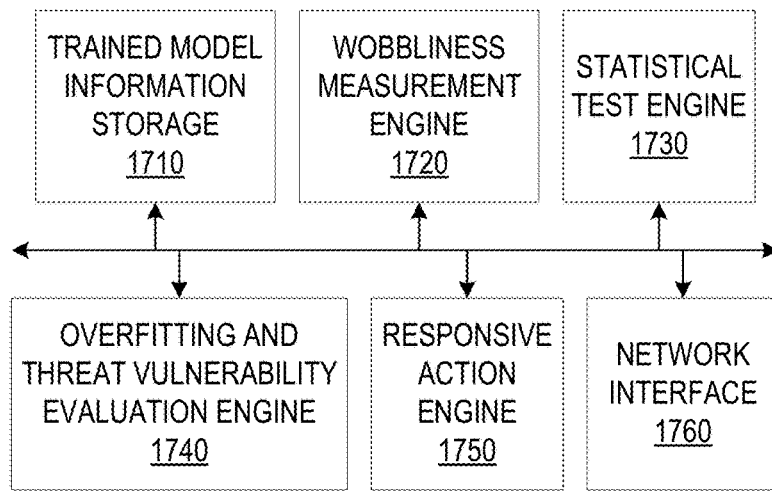
FIG. 17 is an example block diagram of the primary operational components of a MOTA system in accordance with one illustrative embodiment.

FIG. 17 is an example block diagram of the primary operational components of a MOTA system in accordance with one illustrative embodiment. As shown in FIG. 17, the MOTA system may include a trained model information storage 1710, a wobbliness measurement engine 1720, a statistical test engine 1730, an overfitting and threat vulnerability evaluation engine 1740, a responsive action engine 1750, and a network interface 1760. These are primary operational elements for purposes of describing the improved functionality of the improved computing tool described above, however it should be appreciated that the depiction is not intended to be descriptive of all of the elements of computing tool implementing the MOTA system. To the contrary, other engines, logic, and the like, may be provided to facilitate the interaction of the elements depicted as well as perform other control, message passing, and fundamental computing operations that support the functionality described and attributed to the MOTA system herein.

As shown in FIG. 17, the network interface 1760 provides a communication interface through which data is received and transmitted via one or more wired/wireless data networks, such as data network 1502 in FIG. 15. The network interface 1760 may perform various generally known data communication processes for sending/receiving data packets and the like via the data network 1502 including protocol processing, queuing, security checks, consistency checks, etc. The MOTA system may receive a trained machine learning model via the network interface 1760, the output data generated by the trained machine learning model based on processing test data, or any of the other data characteristic of the trained machine learning model described previously in one or more of the illustrative embodiments, and may store the trained machine learning model and/or other trained machine learning model information the trained model information storage 1710. In some cases, the trained machine learning model may be executed on a test data set after receipt by the MOTA system so that output data may be generated in a secure manner and stored in the trained model information storage 1710 for processing by the other elements.

The wobbliness measurement engine 1720 performs operations to select data points of interest x and sample data points around the selected data points of interest x to perform the various operations described above to generate a wobbliness measurement W and/or components/implementations of the wobbliness measurement W with regard to variance $W_v$, class area $W_a$, and entropy of the classifications $W_e$. The wobbliness measurements are provided to the statistical test engine 1730 that applies statistical tests to the measurements to generate additional statistical insight information as described above with regard to the various underlying observations used to justify the wobbliness measurement(s) and their relation to overfitting and security vulnerabilities of trained machine learning models.

The wobbliness measurement(s) and statistical insights data are provided as input to the overfitting and threat vulnerability evaluation engine 1740 which utilizes a rules-based engine, a trained overfit determination model, or the like, to evaluate the wobbliness measurement(s) and statistical insights data to generate a classification of the trained machine learning model with regard to overfitting and, in some embodiments, vulnerability to computer security threats, such as backdoors, membership inference attacks, and adversarial examples. The classifications generated by the overfitting and threat vulnerability evaluation engine 1740 are provided to the responsive action engine 1750 which operates on the classifications to perform appropriate responsive actions, such as transmitting notifications, generating outputs to authorized users, or even automatically or semi-automatically performing operations either directly or in conjunction with other computing systems, to mitigate reliance of users and other computer processes on an overfit or potentially vulnerable trained machine learning model that may generate incorrect results.

Thus, the illustrative embodiments provide an improved computer tool implementing a novel measurement for evaluating overfitting of computer trained machine learning models as well as security vulnerabilities of these computer trained machine learning models. The illustrative embodiments provide a mechanism for identifying this overfitting and security vulnerabilities with regard to individual selected data points of interest and sampled data points within a variance of the selected data points of interest to determine where the trained machine learning model is overfit and to determine specific types of security vulnerabilities that the trained machine learning model may be susceptible to, e.g., backdoors, membership inference, or adversarial examples. Thus, specific instances of trained model overfitting and security vulnerabilities may be identified and appropriate responsive actions taken either automatically or semi-automatically.

Figure 18:
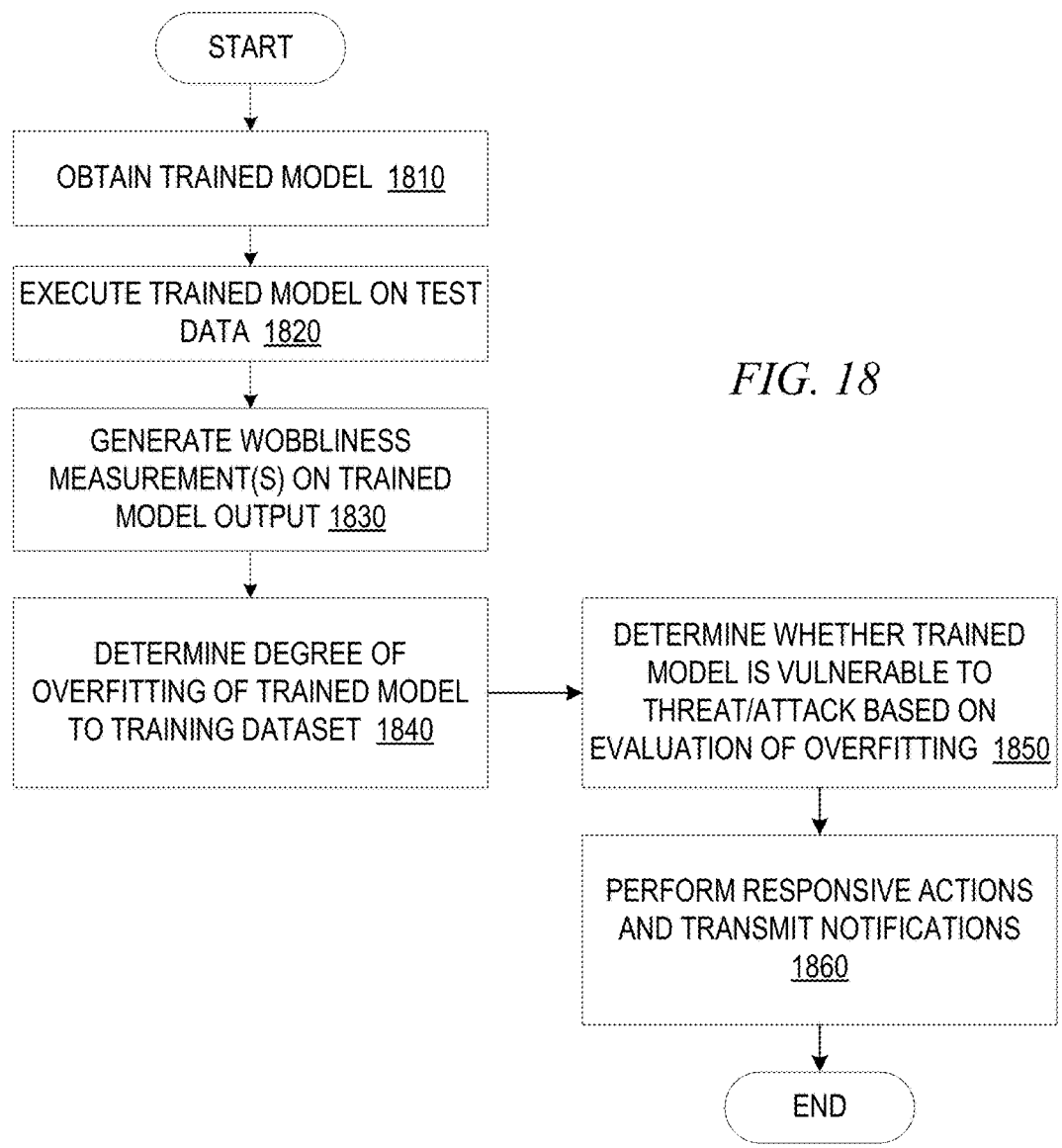
FIG. 18 is a flowchart outlining an example operation of a MOTA system with regard to evaluating a trained machine learning model as to whether it is overfit to the training data and/or vulnerable to security threats/attacks in accordance with one illustrative embodiment.

FIG. 18 is a flowchart outlining an example operation of a MOTA system with regard to evaluating a trained machine learning model as to whether it is overfit to the training data and/or vulnerable to security threats/attacks in accordance with one illustrative embodiment. As shown in FIG. 18, the MOTA system first obtains a trained machine learning model and/or output data generated by a trained machine learning model based on processing of test data (step 1810). If the trained machine learning model has not already been executed on the test data, it is executed on the test data (step 1820) and one or more wobbliness measurements are generated based on the trained machine learning model output generated through the processing of the test data (step 1830). A degree of overfitting of the trained model to the training dataset is determined based on the wobbliness measurement(s) and potentially statistical insights generated by one or more statistical tests as discussed previously (step 1840). Moreover, based on the wobbliness measurement(s) and the statistical insights, a determination is made as to whether the trained machine learning model is vulnerable to specific types of threats/attacks, e.g., backdoor attack, membership inference attack, or the like (step 1850). Based on the evaluation of the overfitting of the trained machine learning model and/or security vulnerability analysis, responsive actions and transmission of notifications are performed (step 1860). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory comprising instructions executed by the at least one processor to determine a susceptibility of a trained machine learning model to a cybersecurity threat, the method comprising:
 executing a trained machine learning model on a test dataset to generate test results output data;
 determining an overfit measure of the trained machine learning model based on the generated test results output data, wherein the overfit measure quantifies an amount of overfitting of the trained machine learning model to a specific sub-portion of the test dataset;
 applying analytics to the overfit measure to determine a susceptibility probability that indicates a likelihood that the trained machine learning model is susceptible to a cybersecurity threat based on the determined amount of overfitting of the trained machine learning model; and
 performing a corrective action based on the determined susceptibility probability, wherein determining the overfit measure of the trained machine learning model comprises:
 generating an area wobbliness value based on classification percentage values of the test results output data;
 generating an entropy wobbliness value based on a calculated entropy of the test results output data; and
 determining the overfit measure based on the area wobbliness value and the entropy wobbliness value.

2. The method of claim 1, wherein the sub-portion of the test dataset is a single data point in the test dataset, and wherein determining an overfit measure of the machine learning model comprises determining a stability of a decision surface around the single data point.

3. The method of claim 2, wherein the stability of the decision surface around the single data point is determined based on sampling data points of a region around the single data point and determining a distribution of outputs corresponding to the sampled data points.

4. The method of claim 3, wherein the overfit measure is a wobbliness measurement derived based on an area, entropy, and variance of the outputs corresponding to the sampled data points.

5. The method of claim 4, wherein determining the overfit measure comprises, for each sampled data point:
 generating a vector output of the machine learning model indicating classification percentage values for each of a plurality of predefined classes into which the machine learning model is trained to classify input data points;
 selecting a highest classification percentage in the vector output as an area wobbliness value;
 calculating an entropy over the vector output as an entropy wobbliness value; and
 determining the susceptibility probability of the trained machine learning model based on a relationship of the area wobbliness value to a first threshold value and a relationship of the entropy wobbliness value to a second threshold value.

6. The method of claim 4, wherein determining a susceptibility probability comprises training a susceptibility machine learning model to generate the susceptibility probability based on one or more of the area, entropy, and variance of the outputs corresponding to the sampled data points.

7. The method of claim 2, wherein the single data point is a data point that represents a potential backdoor trigger for a backdoor in the trained machine learning model.

8. The method of claim 1, wherein the corrective action comprises outputting the determined susceptibility probability to a security incident and event management (SIEM) computing system, and wherein the SIEM computing system automatically performs the corrective action in response to receiving the determined susceptibility probability from the data processing system.

9. The method of claim 1, wherein the corrective action comprises removing the trained machine learning model from runtime operation, retraining the machine learning model, identifying a training dataset used to train the machine learning model that is determined to be poisoned and notifying a provider of the poisoned training dataset, and rejecting the poisoned training dataset for use in training other machine learning models.

10. The method of claim 1, wherein determining the overfit measure of the trained machine learning model further comprises generating a vector output of the machine learning model indicating the classification percentage values for each of a plurality of predefined classes into which the machine learning model is trained to classify input data points.

11. The method of claim 1, wherein the susceptibility probability is determined based on at least one of a first relationship of at least one of the area wobbliness value to a first threshold value, or a second relationship of the entropy wobbliness value to a second threshold value.

12. A computer program product comprising a computer readable storage medium having a computer readable program stored therein, wherein the computer readable program, when executed on a data processing system, causes the data processing system to:
 execute a trained machine learning model on a test dataset to generate test results output data;
 determine an overfit measure of the trained machine learning model based on the generated test results output data, wherein the overfit measure quantifies an amount of overfitting of the trained machine learning model to a specific sub-portion of the test dataset;
 apply analytics to the overfit measure to determine a susceptibility probability that indicates a likelihood that the trained machine learning model is susceptible to a cybersecurity threat based on the determined amount of overfitting of the trained machine learning model; and
 perform a corrective action based on the determined susceptibility probability, wherein determining the overfit measure of the trained machine learning model comprises:
 generating an area wobbliness value based on classification percentage values of the test results output data;
 generating an entropy wobbliness value based on a calculated entropy of the test results output data; and
 determining the overfit measure based on the area wobbliness value and the entropy wobbliness value.

13. The computer program product of claim 12, wherein the sub-portion of the test dataset is a single data point in the test dataset, and wherein determining an overfit measure of the machine learning model comprises determining a stability of a decision surface around the single data point.

14. The computer program product of claim 13, wherein the stability of the decision surface around the single data point is determined based on sampling data points of a region around the single data point and determining a distribution of outputs corresponding to the sampled data points.

15. The computer program product of claim 14, wherein the overfit measure is a wobbliness measurement derived based on an area, entropy, and variance of the outputs corresponding to the sampled data points.

16. The computer program product of claim 15, wherein determining the overfit measure comprises, for each sampled data point:
   generating a vector output of the machine learning model indicating classification percentage values for each of a plurality of predefined classes into which the machine learning model is trained to classify input data points;
   selecting a highest classification percentage in the vector output as an area wobbliness value;
   calculating an entropy over the vector output as an entropy wobbliness value; and
   determining the susceptibility probability of the trained machine learning model based on a relationship of the area wobbliness value to a first threshold value and a relationship of the entropy wobbliness value to a second threshold value.

17. The computer program product of claim 15, wherein determining a susceptibility probability comprises training a susceptibility machine learning model to generate the susceptibility probability based on one or more of the area, entropy, and variance of the outputs corresponding to the sampled data points.

18. The computer program product of claim 13, wherein the single data point is a data point that represents a potential backdoor trigger for a backdoor in the trained machine learning model.

19. The computer program product of claim 12, wherein the corrective action comprises outputting the determined susceptibility probability to a security incident and event management (SIEM) computing system, and wherein the SIEM computing system automatically performs the corrective action in response to receiving the determined susceptibility probability from the data processing system.

20. An apparatus comprising:
   a processor; and
   a memory coupled to the processor, wherein the memory comprises instructions which, when executed by the processor, cause the processor to:
   execute a trained machine learning model on a test dataset to generate test results output data;
   determine an overfit measure of the trained machine learning model based on the generated test results output data, wherein the overfit measure quantifies an amount of overfitting of the trained machine learning model to a specific sub-portion of the test dataset;
   apply analytics to the overfit measure to determine a susceptibility probability that indicates a likelihood that the trained machine learning model is susceptible to a cybersecurity threat based on the determined amount of overfitting of the trained machine learning model; and
   perform a corrective action based on the determined susceptibility probability, wherein determining the overfit measure of the trained machine learning model comprises:
   generating an area wobbliness value based on classification percentage values of the test results output data;
   generating an entropy wobbliness value based on a calculated entropy of the test results output data; and
   determining the overfit measure based on the area wobbliness value and the entropy wobbliness value.

* * * * *